US008928286B2

(12) United States Patent
Amiruddin et al.

(10) Patent No.: US 8,928,286 B2
(45) Date of Patent: Jan. 6, 2015

(54) VERY LONG CYCLING OF LITHIUM ION BATTERIES WITH LITHIUM RICH CATHODE MATERIALS

(75) Inventors: Shabab Amiruddin, Fremont, CA (US); Bing Li, Union City, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 731 days.

(21) Appl. No.: 13/213,756

(22) Filed: Aug. 19, 2011

(65) Prior Publication Data

US 2012/0056590 A1     Mar. 8, 2012

Related U.S. Application Data

(60) Provisional application No. 61/380,004, filed on Sep. 3, 2010.

(51) Int. Cl.

| H01M 10/44 | (2006.01) |
| H01M 10/46 | (2006.01) |
| H01M 10/0525 | (2010.01) |
| H01M 4/505 | (2010.01) |
| H01M 4/525 | (2010.01) |
| H01M 4/36 | (2006.01) |
| H01M 10/0567 | (2010.01) |

(52) U.S. Cl.
CPC .......... H01M 10/0525 (2013.01); H01M 10/44 (2013.01); H01M 4/505 (2013.01); H01M 4/525 (2013.01); Y02T 10/7011 (2013.01); Y02E 60/122 (2013.01); H01M 4/366 (2013.01); H01M 10/0567 (2013.01)
USPC ........................................................ 320/130

(58) Field of Classification Search
USPC .......... 320/107, 128, 130; 429/188, 206, 220, 429/223, 231.5
See application file for complete search history.

(56) References Cited

U.S. PATENT DOCUMENTS

| 5,658,693 | A | 8/1997 | Thackeray et al. |
| 5,674,645 | A | 10/1997 | Amatucci et al. |
| 6,037,095 | A | 3/2000 | Miyasaka |
| 6,087,042 | A | 7/2000 | Sugiyama et al. |
| 6,168,887 | B1 | 1/2001 | Dahn et al. |
| 6,183,718 | B1 | 2/2001 | Barker et al. |
| 6,248,477 | B1 | 6/2001 | Howard, Jr. et al. |
| 6,251,822 | B1 | 6/2001 | Peng et al. |
| 6,322,744 | B1 | 11/2001 | Kelley et al. |
| 6,372,385 | B1 | 4/2002 | Kweon et al. |
| 6,420,071 | B1 | 7/2002 | Lee et al. |
| 6,428,766 | B1 | 8/2002 | Fujino et al. |
| 6,489,060 | B1 | 12/2002 | Zhang et al. |
| 6,589,499 | B2 | 7/2003 | Gao et al. |
| 6,596,435 | B2 | 7/2003 | Kelley et al. |
| 6,660,432 | B2 | 12/2003 | Paulsen et al. |
| 6,677,082 | B2 | 1/2004 | Thackeray et al. |
| 6,680,143 | B2 | 1/2004 | Thackeray et al. |
| 6,749,648 | B1 | 6/2004 | Kumar et al. |
| 6,872,491 | B2 | 3/2005 | Kanai et al. |
| 6,964,828 | B2 | 11/2005 | Lu et al. |
| 7,038,426 | B2 * | 5/2006 | Hall .............................. 320/135 |
| 7,078,128 | B2 | 7/2006 | Lu et al. |
| 7,135,252 | B2 | 11/2006 | Thackeray et al. |
| 7,205,072 | B2 | 4/2007 | Kang et al. |
| 7,285,357 | B2 | 10/2007 | Jordy et al. |
| 7,364,793 | B2 | 4/2008 | Paulsen et al. |
| 7,368,071 | B2 | 5/2008 | Dahn et al. |
| 7,393,476 | B2 | 7/2008 | Shiozaki et al. |
| 7,416,813 | B2 | 8/2008 | Fujihara et al. |
| 7,435,402 | B2 | 10/2008 | Kang et al. |
| 7,452,631 | B2 | 11/2008 | Kitao et al. |
| 7,468,223 | B2 | 12/2008 | Thackeray et al. |
| 7,517,613 | B2 | 4/2009 | Yuasa et al. |
| 7,674,557 | B2 | 3/2010 | Sun et al. |
| 7,927,506 | B2 | 4/2011 | Park |
| 7,935,270 | B2 | 5/2011 | Park |

(Continued)

FOREIGN PATENT DOCUMENTS

| EP | 2264814 A1 | 12/2010 |
| JP | 57065674 A2 | 4/1982 |

(Continued)

OTHER PUBLICATIONS

Aurbach et al., "On the capacity fading of LiCoO2 intercalation electrodes: the effect of cycling, storage, temperature, and surface film forming additives," Electrochimica Acta 47 (2002) 4291-4306.
Boulineau et al., "Reinvestigation of Li2MnO3 Structure: Electron Diffraction and High Resolution TEM," Chem. Mater. 2009, 21, 4216-4222.
Chen et al., "Studies of LiCoO2 Coated with Metal Oxides," Electrochemical and Solid State Letters, 6 (11) A221-A224 (2003).

(Continued)

*Primary Examiner* — Edward Tso
(74) *Attorney, Agent, or Firm* — Dardi & Herbert, PLLC; Peter S. Dardi

(57) ABSTRACT

Lithium ion batteries can be activated and then cycled to exploit a moderate fraction of the discharge cycling capacity such that the discharge capacity and average discharge voltage stay within initial values for thousands of cycles. The superior cycling performance has been achieved at relatively high discharge rates and for practical battery formats. Lithium ion battery performance can also be achieved with superior cycling performance with partially activated batteries such that good discharge capacities can be exploited for many thousands of cycles before the discharge capacity and average discharge voltage drops more than 20% from initial values. The positive electrode active material can be a lithium rich metal oxide. The activation of the battery can comprise phase changes of the active materials. As described herein, the phase changes can be manipulated to exploit a reasonable fraction of the available high capacity of the material while providing outstanding cycling stability.

37 Claims, 10 Drawing Sheets

(56) References Cited

U.S. PATENT DOCUMENTS

| | | |
|---|---|---|
| 2002/0055042 A1 | 5/2002 | Kweon et al. |
| 2002/0114995 A1 | 8/2002 | Thackeray et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1 | 5/2004 | Kang et al. |
| 2005/0031942 A1 | 2/2005 | Hennige et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0087362 A1 | 4/2009 | Sun et al. |
| 2009/0127520 A1 | 5/2009 | Whitfield et al. |
| 2009/0155694 A1 | 6/2009 | Park |
| 2009/0263707 A1 | 10/2009 | Buckley et al. |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0104944 A1 | 4/2010 | Saito et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1* | 3/2011 | Lopez et al. .................. 429/206 |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2011/0244331 A1 | 10/2011 | Karthikeyan et al. |
| 2012/0028105 A1 | 2/2012 | Kumar et al. |
| 2012/0070725 A1* | 3/2012 | Venkatachalam et al. .... 429/188 |
| 2012/0105007 A1 | 5/2012 | Amiruddin et al. |
| 2012/0107680 A1 | 5/2012 | Amiruddin et al. |

FOREIGN PATENT DOCUMENTS

| | | |
|---|---|---|
| JP | 06-243871 | 9/1994 |
| JP | 09-045373 | 2/1997 |
| JP | 10-255837 | 9/1998 |
| JP | 3112138 | 9/2000 |
| JP | 2002-110167 | 4/2002 |
| JP | 3506397 | 12/2003 |
| JP | 2006-134816 | 5/2006 |
| JP | 2006-344425 | 12/2006 |
| JP | 2007-220630 | 8/2007 |
| JP | 2008-258160 A | 10/2007 |
| JP | 3276451 | 2/2008 |
| JP | 2008-536285 A | 9/2008 |
| JP | 5023541 | 6/2012 |
| KR | 10-2005-0111764 | 11/2005 |
| KR | 10-0578877 | 5/2006 |
| KR | 10-2007-0117827 | 12/2007 |
| KR | 10-0796953 | 1/2008 |
| KR | 10-0822013 | 4/2008 |
| KR | 10-2008-0099132 | 11/2008 |
| KR | 10-2009-0078128 | 7/2009 |
| WO | 99/60638 A2 | 11/1999 |
| WO | 01/35473 A1 | 5/2001 |
| WO | 2004/084330 A2 | 9/2004 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |
| WO | 01/91209 A1 | 11/2011 |

OTHER PUBLICATIONS

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina drived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Ho et al., "Application of A—C Techniques to the Study of Lithium Diffusion in Tungsten Trioxide Thin Films," J. Electrochem. Soc., 1980; 127(2):343-350.

Hong et al., "Structural evolution of layered Li1.2Ni0.2Mn0.6O2 upon electrochemical cycling in a Li rechargeable battery," J. Mater. Chem., 2010, 20, 10179-10186.

Hwang et al. "Influence of Mn content on the morphology and electrochemical performance of LiNi1-x-yCoxMnyO2 cathode materials," J. Mater. Chem., 2003; 13:1962-1968.

Ito et al., "The relationship between crystal structure and the electrochemical reaction of Li-rich insertion materials (2)" 2010. (See English language abstract.).

Johnson et al., "Lithium-manganese oxide electrodes with layered-spinel composite structures xLi2MnO3 · (1−x)Li1+yMn2−yO4 (0<x<1, 0≤y≤0.33) for lithium batteries," Electrochemistry Communications 7 (2005) 528-536.

Johnson et al. "The significance of the Li2MnO3 component in 'composite' xLi2MnO3 • (1−x)LiMn0.5Ni0.5O2 electrodes," Electrochemistry Communications 6 (2004) 1085-1091.

Kang et al., "Enchancing the rate capability of high capacity xLi2MnO3 · (1−x)LiMO2 (M=Mn, Ni, Co) electrodes by Li—Ni—PO4 treatment," Electrochemistry Communications 11 (2009) 748-751.

Kang et al., "The Effects of Acid Treatment on the Electrochemical Properties of 0.5 Li2MnO3·0.5LiNi0.44Co0.25Mn.031O2 Electrodes in Lithium Cells," Journal of the Electrochemical Society 153(6):A1186-A1192 (2006).

(56) References Cited

OTHER PUBLICATIONS

Kang et al., "Layered Li(Li0.2Ni0.15+0.5zCo0.10Mn0.55-0.5z)O2-zFz cathode materials for Li-ion secondary batteries," Journal of Power Sources 146 (2005) 654-657.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Synthesis of spherical Li[Ni(1/3-z)Co(1/3-z)Mn(1/3-z)Mgz]O2 as positive electrode material for lithium ion battery," Electrochimica Acta 51 (2006) 2447-2453.

Kim et al., "Improvement of High-Voltage Cycling Behavior of Surface-Modified Li[Ni1/3Co1/3Mn1/3]O2 Cathodes by Fluorine Substitution for Li-Ion Batteries," Journal of the Electrochemical Society 152 (9) A1707-A1713 (2005).

Kim et al., "Electrochemical and Structural Properties of xLi2M'O3-(1-x)LiMn0.5Ni0.5O2 Electrodes for Lithium Batteries (M' = Ti, Mn, Zr; $0 \leq x \leq m\ 0.3$)" Chem. Mater. 2004, 16, 1996-2006.

Kim et al., "Electrochemical Stability of Thin-Film LiCoO2 Cathodes by Aluminum—Oxide Coating," Chem. Mater. 2003, 15(7):1505-1511.

Lee et al., "High capacity Li[Li0.2Ni0.2Mn0.6]O2 cathode materials via a carbonate co-precipitation method," J. of Power Sources, 162 (2006), 1346-1350.

Lee et al., "Electrochemical characteristics of Al2O3-coated lithium manganese spinel as a cathode material for a lithium secondary battery," J. of Power Sources 126 (2004) 150-155.

Luo et al., "On the incorporation of fluorine into the manganese spinel cathode lattice," Solid State Ionics 180 (2009) 703-707.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010. (See English language abstract.).

Park et al., "Physical and electrochemical properties of spherical Li1+x(Ni1/3Co1/3Mn1/3)1-xO2 cathode materials", Journal of Power Sources, 177:177-183 (2008).

Park et al., "Lithium—manganese—nickel—oxide electrodes with integrated layered-spinel structures for lithium batteries," Electrochemistry Communications 9 (2007) 262-268.

Robertson et al., "Mechanism of Electrochemical Activity in Li2MnO3," Chem. Mater. 2003, 15, 1984-1992.

Song et al., "Two- and three-electrode impedance spectroscopy of lithium-ion batteries," J. of Power Sources, 2002; 111:255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al., "The preparation and electrochemical performance of solid solutions LiCoO2-Li2MnO3 as cathode materials for lithium ion batteries," J. of Power Sources 159 (2006) 1353-1359.

Sun et al., "Significant Improvement of high voltage cycling behavior AlF3-coated LiCoO2 cathode," Electrochemistry Communications 8 (2006) 821-826.

Thackeray et al., "Li2MnO3-stabilized LiMO2 (M = Mn, Ni, Co) electrodes for lithium-ion batteries," J. Mater. Chem., 2007; 17:3112-3125.

Thackeray et al., "Comments on the structural complexity of lithium-rich Li1+xM1−xO2 electrodes (M=Mn,Ni,Co) for lithium batteries," Electrochemistry Communications 8 (2006), 1531-1538.

Thackeray et al., "Advances in manganese-oxide 'composite' electrodes for lithium-ion batteries," J. Mater. Chem., 2005,15, 2257-2267.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1−x)/3Mn(2−x)/3Nix/3Cox/3]O2 Cathodes with Low Irreversible Capacity Loss," Electrochemical and Solid State Letters, 9 (5) A221-A224 (2006).

Yabuuchi et al., "Detailed Studies of a High-Capacity Electrode Material for Rechargeable Batteries, Li2MnO3-LiCo1/3Ni1/3Mn1/3O2," J. Am. Chem. Soc. 2011, 133, 4404-4419.

Yabuuchi et al., "Study of LiMnO3—Li(Co1/3Ni1/3Mn1/3)O2 for High Capacity Positive Electrode Material: II. Redox Reaction at the Positive Electrode/Electrolyte Interface," 2010. (See English language abstract.).

Yoshii et al., "Study of LiMnO3—Li(Co1/3Ni1/3Mn1/3)O2 for High Capacity Positive Electrode Material: I. Change in the Crystal and Electronic Structure upon Li de-intercalation," 2010. (See English language abstract.).

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Shin et al., "Improvement of electrochemical properties of Li[Ni0.4Co0.2Mn(0.4−x)]O2-yFy cathode materials at high voltage region", Electrochimica Acta 52 1477-1482 (2006).

Ito et al., "Cyclic deterioration and it's improvement for Li-rich layered cathode material Li[Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Jiang et. al. "Structure, Electrochemical Properties, and Thermal Stability Studies of Cathode Materials in the xLi[Mn1/2Ni1/2]O2·yLiCoO2·zLi[Li1/3Mn2/3]O2 Pseudoternary System (x +y +z =1)," Journal of the Electrochemical Society, 152(9): A1879-A1889 (2005).

Shin et al., "Synthesis and electrochemical properties of Li[Li(1−2x)/3NixMn(2−x)/3]O2 as cathode materials for lithium secondary batteries," Journal of Power Sources 112: 634-638 (2002).

Office Action from corresponding ROC (Taiwan) Patent Application No. 100131826 dated Oct. 28, 2013 with translation (13 pages).

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

* cited by examiner

VERY LONG CYCLING OF LITHIUM ION BATTERIES WITH LITHIUM RICH CATHODE MATERIALS

CROSS REFERENCE TO RELATED APPLICATIONS

This application claims priority to U.S. provisional patent application 61/380,004 filed on Sep. 3, 2010 to Amiruddin et al., entitled "Voltage Windows For Battery Cycling To Control Material Structure for Lithium Rich Positive Electrode Compositions," incorporated herein by reference.

FIELD OF THE INVENTION

The invention relates to lithium ion batteries with a high capacity lithium rich metal oxide cathode active material that are formed to stabilize cycling out to an enormous number of cycles at moderate capacity utilization. The invention further relates to methods for cycling batteries at moderate capacities to obtain unprecedented moderately high capacity for a very large number of cycles.

BACKGROUND OF THE INVENTION

Rechargeable lithium ion batteries, also known as secondary lithium ion batteries are desirable as power sources for a wide range of applications. Their desirability stems from their relative high energy density. The capacities of secondary lithium ion batteries have been greatly improved with the development of high capacity lithium rich metal oxides for use as positive electrode active materials. With cycling, however, secondary lithium ion batteries generally have decreased performance with increased cycle number. For some important applications, such as vehicle application, it is desired that secondary lithium ion batteries be able to charge and recharge for many cycles without a great loss of performance.

SUMMARY OF THE INVENTION

In a first aspect, the invention pertains to a lithium ion battery comprising a positive electrode comprising a lithium rich metal oxide composition, a negative electrode comprising a lithium intercalation/alloying composition and a non-aqueous electrolyte comprising lithium ions, and a separator between the negative electrode and the positive electrode. In some embodiments, the battery has been cycled through a formation cycle and wherein at the 500th cycle, the battery has a specific discharge capacity based on the mass of the positive electrode active composition of at least about 100 mAh/g at a discharge rate of C/3 from 4.25V to 2.0V that is at least about 90% of the 5th cycle specific discharge capacity and an average discharge voltage at a discharge rate of C/3 that is at least about 87.5% of the $5^{th}$ cycle average discharge voltage.

In further aspects, the invention pertains to a method for cycling a lithium ion battery having a positive electrode comprising a lithium rich metal oxide, the method comprising the step of cycling the battery, following an initial formation cycle, with a charge voltage from about 4V to about 4.35V at an average discharge rate from about C/5 to about 2C. In some embodiments, the capacity after 2000 cycles is at least about 80 percent of the capacity at the 5th cycle at the same average discharge rate and the average voltage after 2000 cycles is at least about 85 percent of the 5th cycle average voltage at the same average discharge rate. Also, the battery can have a specific discharge capacity at the 5th cycle of at least about 100 mAh/g.

In other embodiments, the invention pertains to a method for cycling a lithium ion battery having a positive electrode comprising a lithium rich metal oxide, in which the method comprises the step of cycling the battery following an initial formation cycle with a charge voltage from about 3.8 to about 4.25 at an average rate from about C/5 to about 2C. In some embodiments, the capacity after 2000 cycles is at least about 80 percent of the capacity at the 5th cycle at the same average rate and the average voltage after 2000 cycles is at least about 85 percent of the 5th cycle average voltage at the same average rate.

In additional embodiments, the invention pertains to a method for cycling a lithium ion battery having a positive electrode comprising a lithium rich metal oxide, in which the method comprises, following an initial formation cycle, cycling the battery with a charge voltage from about 4.25 to about 4.375 at an average rate from about C/5 to about 2C, and in which the battery is discharged to a voltage of no more than about 2.9V at least once every 200 cycles. In some embodiments, the capacity after 2000 cycles is at least about 80 percent of the capacity at the 5th cycle at the same average rate, and the average voltage after 2000 cycles is at least about 85 percent of the 5th cycle average voltage at the same average rate.

DETAILED DESCRIPTION OF THE INVENTION

Figure 1:
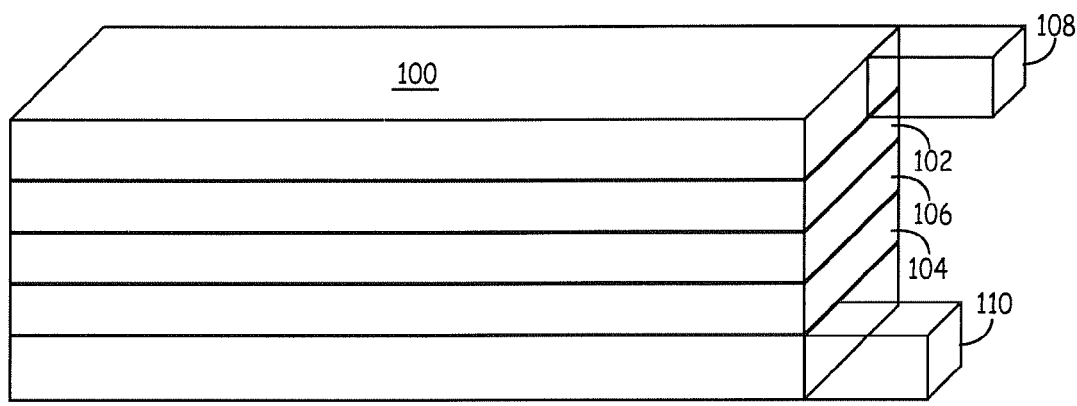
FIG. 1 is a schematic drawing of a battery structure separated from a container.

Techniques have been developed to provide for cycling of high capacity lithium rich metal oxides that take advantage of a significant fraction of the potential high capacity of the cathode active materials while providing outstanding and exceptional cycling stability. A relatively new class of lithium rich mixed metal manganese oxide compositions can exhibit very high capacity with cycling at a high charge voltage. The lithium rich metal oxides of particular interest are believed to form a layered-layered multiple phase material upon synthesis. While these lithium rich metal oxides can exhibit high capacities over moderate levels of cycling, for some applications it is desirable to have very long cycling stability. It has been discovered that an understanding of an irreversible reaction of the lithium rich metal oxides during high voltage cycling can be exploited to obtain very stable long term cycling while accessing a significant fraction of the available capacity. Long cycling stability has been achieved with respect to both capacity and average voltage, which is significant for supplying desired energy output for certain applications. Specifically, the batteries formed with the lithium rich metal oxides can be formed with charging to a voltage of at least about 90% state of charge (SOC), or generally about 4.45V, to activate the lithium rich materials and then cycled with a lower charge voltage, such as a voltage of no more than about 4.2V to stabilize the cycling while accessing a larger fraction of the capacity due to the activation of the active material. In alternative or additional embodiments, the battery can be cycled with a charge voltage from about 4.225V to about 4.45V to gradually activate the lithium rich active material that makes a higher voltage phase available for cycling. Similarly, the battery can be charged in the first cycle to partially activate the lithium rich active material and then cycled to the same or different charge voltage within the voltage window, which may or may not further gradually activate a stable active phase of the material without forming metal oxide phases that degrade with cycling. As described below, various variations on the activation and cycling can be used based on these concepts.

The activation of the positive electrode active material is believed to involve irreversible changes to one of the initial phases of the material. As described herein, the stability of the activated phase depends on the subsequent cycling of the battery. Activation of the lithium rich material can be accomplished with an initial charge to an appropriate voltage, and a suitable formation protocol can be used. Partial activation can be accomplished through an initial charge to a voltage that is high enough to induce a partial phase change in one of the initial phases of the lithium rich material. The gradual activation is believed to involve small amounts of phase conversion at each cycle through the reaction of the initial phase to the irreversible product phase. Through the improved manipulation of the phases of the active material, the resulting batteries can be cycled for a dramatically extended number of cycles with a capacity that is at least 80% of an initial capacity at a reasonable rate of discharge. Thus, batteries with good capacities and energy outputs can be formed with desired cycling for greater than a 1500 cycles, which are suitable for vehicle use. It has been found that the batteries can also be cycled well at relatively high rates for desired power output. The stability of the positive electrode active material has been confirmed at long cycling based on an evaluation after cycling the battery for more than a thousand cycling and determining that only very low levels of Mn are found in the negative electrode, which indicates that only low amounts of manganese has dissolved from the positive electrode into the electrolyte after this large number of cycles.

Layered-layered lithium rich mixed metal oxides have been found that provide high capacity performance when cycled over a large voltage range. The layered-layered lithium rich metal oxides can be used to construct batteries that have a combination of good cycling performance, high specific capacity, high overall capacity, relatively high average voltage and excellent rate capability. The resulting lithium ion batteries can be used as an improved power source, particularly for high energy applications. For certain applications, such as electric vehicles, plug in hybrid electric vehicles and the like, the batteries comprise a large cost factor, and for product efficiency, the batteries used in the vehicle are desired to last a long time, generally several thousand cycles without excessive performance decay. The positive electrode materials can exhibit a relatively high average voltage over a discharge cycle so that the batteries can have high energy output along with a high specific capacity. The active materials can have an appropriate coating to provide for an improvement in cycling as well as potentially a reduction in irreversible capacity loss and an increase in specific capacity. While promising results have been presented for these material, as described herein significant improvements in performance are described for these materials such that the materials can be very desirable for an even broader range of commercial applications.

The batteries described herein are lithium-based batteries in which a non-aqueous electrolyte solution comprises lithium ions. For secondary lithium ion batteries during charge, oxidation takes place in the cathode (positive electrode) where lithium ions are extracted and electrons are released. During discharge, reduction takes place in the cathode where lithium ions are inserted and electrons are consumed. Generally, the batteries are formed with lithium ions in the positive electrode material such that an initial charge of the battery transfers a significant fraction of the lithium from the positive electrode material to the negative electrode material to prepare the battery for discharge. Unless indicated otherwise, performance values referenced herein are at room temperature.

When the corresponding batteries with intercalation-based positive electrode active materials are in use, the intercalation and release of lithium ions from the lattice induces changes in the crystalline lattice of the electroactive material. As long as these changes are essentially reversible, the capacity of the material does not change significantly with cycling. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell. The irreversible capacity loss generally can be attributed to changes during the initial charge-discharge cycle of the battery materials, which, in general, can occur at both the cathode and the anode.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The lithium ion batteries can use a positive electrode active material that is lithium rich relative to a reference homogenous electroactive lithium metal oxide composition. The class of lithium rich positive electrode active materials of interest can be approximately represented with a formula:

$$Li_{1+b}Ni_\alpha Mn_\beta Co_\gamma A_\delta O_{2-z}F_z, \qquad (1)$$

where b ranges from about 0.01 to about 0.3, α ranges from 0 to about 0.4, β range from about 0.2 to about 0.65, γ ranges from about 0 to about 0.46, δ ranges from about 0.001 to about 0.15, and z ranges from 0 to about 0.2 with the proviso that both α and γ are not zero, and where A is a metal different from Ni, Mn and Co or a combination thereof. Element A and F (fluorine) are optional cation and anion dopants, respectively. Elements A can be, for example, Mg, Sr, Ba, Cd, Zn, Al, Ga, B, Zr, Ti, Ca, Ce, Y, Nb, Cr, Fe, V, or combinations thereof. The use of a fluorine dopant in lithium rich metal oxides to achieve improved performance is described in published U.S. patent application 2010/0086854 to Kumar et al., entitled "Fluorine Doped Lithium Rich Metal Oxide Positive Electrode Battery Materials With High Specific Capacity and Corresponding Batteries," incorporated herein by reference.

In some embodiments, it is believed that appropriately formed lithium-rich lithium metal oxides have a composite crystal structure. For example, in some embodiments of lithium rich materials, a layered $Li_2MO_3$ material may be structurally integrated with either a layered $LiM'O_2$ component, in which a reference structure has M and M' being manganese, although particular compositions of interest have a portion of the manganese cations substituted with other transition metal cations with appropriate oxidation states. In some embodiments, the positive electrode material can be represented in two component notation as $xLi_2MO_3\cdot(1-x)LiM'O_2$ where M' is one or more metal cations with an average valence of +3 with at least one cation being a manganese cation or a nickel cation, and where M is one or more metal cations with an average valence of +4. Generally, for compositions of particular interest, M can be considered to be Mn. The general class of compositions are described further, for example, in U.S. Pat. No. 6,680,143 (the '143 patent) to Thackeray et al., entitled "Lithium Metal Oxide Electrodes for Lithium Cells and Batteries," and published U.S. patent application 2011/0052981A to Lopez et al., entitled "Layer-Layer Lithium Rich Complex Metal Oxides With High Specific Capacity and Excellent Cycling," both of which are incorporated herein by reference (the '981 application).

The compositions expressed in the single component notation and two component notation can be related. Specifically, if b+α+β+γ+δ in formula (1) above is approximately equal to 1, the material can be a layered-layered material approximately represented by the formula $x\cdot Li_2MnO_3\cdot(1-x)LiNi_uMn_vCo_wA_yO_2$, assuming for simplicity that z=0. With respect to the charging of a battery with the composite materials, the lithium manganese oxide ($Li_2MnO_3$) component of the compositions can undergo a reaction to release molecular oxygen with an associated release of 2 Li ions as indicated in equation (2):

$$Li_2MnO_3 \rightarrow (MnO_2) + 2Li^+ + 2e^- + \tfrac{1}{2}O_2 \qquad (2)$$

Upon discharge, the ($MnO_2$) composition takes up a single lithium ion and a single electron to form $LiMnO_2$ so that there is an overall significant decrease in capacity due to the irreversible reaction of the material during the initial charge. The product composition is written as ($MnO_2$) because it is not completely clear what this material is. While Eq. (2) is balanced if ($MnO_2$) is actually $MnO_2$, it is not clear if this is the precise reaction, although oxygen release is observed corresponding to a reduction of the metal. As discussed below, evidence suggests that the reaction schematically represented in Eq. (2) takes place efficiently at voltages above roughly 4.4 volts. Thus, with the lithium rich layered-layered material, during the first cycle charge above roughly 4.2V, decomposition of a $Li_2MnO_3$ component in the high capacity material can lead to oxygen loss and a significant irreversible capacity loss attributable to the positive electrode active material. The materials in principle can undergo other irreversible changes that may coincide with the initial charge step, such as a decomposition reaction $Li_2MnO_3 \rightarrow MnO_2 + Li_2O$. Such a decomposition reaction does not result in a measured irreversible capacity loss since no electrons are generated that would be measured during the initial charge, but such a reaction to form inert lithium oxide could result in a loss of reversible capacity relative to the theoretical capacity for a particular weight of material. The initial reactions involving the active material are not completely understood, although significant additional evidence is presented herein. For example, evidence presented below indicates that only low levels of manganese dissolves into the electrolyte and migrates to the negative electrode so that after 2000 cycles the negative electrode has no more than 1 weight percent of manganese. Differential capacity results are consistent with the stabilization of the positive electrode found with the cycling data.

The formulas presented herein are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen generally is only roughly estimated based on the crystal structure, electrochemical performance and proportions of reactant metals, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

For convenience, the first cycle can be referred to as a formation cycle that involves notable irreversible changes to the battery material. For the activation of the positive electrode active material at high voltage, a desirable multiple step formation protocol has been developed, as described in U.S. patent application Ser. No. 12/732,520, now U.S. Pat. No. 8,765,306 (hereinafter the '520 application) to Amiruddin et al., entitled "High Voltage Battery Formation Protocols and Control of Charging and Discharging for Desirable Long Term Cycling Performance," incorporated herein by reference. After the formation cycle, the lithium rich metal oxides have been found to undergo additional structural changes as a result of cycling at high voltages. In particular, when charged to high voltages, the materials undergo continuing, although more gradual, irreversible changes to the structure. While not wanting to be limited by theory, it is believed that the continuing changes are related to the material noted above as ($MnO_2$). If cycling is continued at high voltages, the material is observed to change to a lower voltage material that is unstable with respect to dissolution of transition metals into the electrolyte. As transition metals dissolve into the electrolyte, capacity is lost, which is consistent with lesser amounts of material being available to cycle the lithium.

During charging and discharging of the battery, the voltage can be used to reference the particular charge state of the battery. In the art, it is also common to alternatively reference the state of charge (SOC) of the battery, which references the percent of the reference capacity remaining in the battery. The SOC can in some sense be less precise since there can be flexibility in setting the reference capacity. The upper limit on the state of charge is the charge needed to fully extract the lithium of the pristine positive electrode active material upon initial assembly of the battery, which may require roughly 5V. The fully extractable capacity of the battery is less than the maximum at later cycles of battery use. During cycling a selected portion of the full SOC can be used to enhance cycling life, and desirable ways of selecting portions of the SOC based on the battery chemistry are described herein.

It has been found that supplemental lithium associated with the negative electrode can help to stabilize the loss of capacity associated with metal dissolution into the electrolyte. Thus, supplemental lithium can stabilize the cycling with respect to capacity of the lithium rich metal oxides out to a significant number of cycles. This discovery is discussed in more detail in copending U.S. patent application Ser. No. 12/938,073 to Amiruddin et al, entitled "Lithium Ion Batteries With Supplemental Lithium," incorporated herein by reference (the '073 application).

In summary, it has been found that significant irreversible changes to the lithium rich metal oxides take place during a first high voltage charge cycle, which involves some loss of molecular oxygen and a corresponding irreversible change in the metal oxide composition. Upon continued high voltage cycling, gradual, continual changes to the materials take place. In materials without the presence of supplemental lithium, the continued structural changes result in a material that is unstable with respect to dissolution into the electrolyte, which results in a gradual loss of capacity and a drop in the average voltage. With high voltage cycling with the presence of supplemental lithium, the active material undergoes a phase change to a material that is relatively stable in the electrolyte, but has a lower cycling voltage so that the average voltage gradually drops as the battery is cycled.

It has been discovered that these material changes can be manipulated to stabilize cycling of the battery with respect to capacity to an amazing degree as well as with respect to average voltage. In particular, the material can undergo an initial activation charge to a voltage above about 4.45V. The activation charge then extracts lithium from a high voltage phase (believed to be essentially $Li_2MnO_3$) that then undergoes irreversible chemical changes that activate one of the phases of the initial material to form the material denoted as ($MnO_2$). It has been discovered that this activated phase ($MnO_2$) can be cycled stably with respect to capacity and average voltage over a voltage range that does not extend to high voltages. However, since the capacity is greater than a corresponding capacity for materials that are not activated, although less than the available capacity if subsequently charged to a greater voltage, the initial phase farmed during the activation cycle can stably cycle if only a relatively smaller portion of the lithium is extracted during the subsequent charge steps.

Very surprising results have been obtained through the intermediate initial charging of the battery and maintaining the corresponding voltage range with cycling. If the battery is charged to a voltage from about 4.225V to about 4.45V, the initial material is found to partially activate. The partially activated material can provide even greater cycling stability. The partial activation may or may not be combined with additional gradual activation. With gradual activation, irreversible changes to the lithium positive electrode active materials take place gradually over many cycles rather than over a single, initial formation cycle. Gradual activation is achieved through cycling to a charge voltage that covers the lower end of the partial activation range, generally from about 4.225V to about 4.45V. Based on this gradual activation of the cathode active material, the capacity as well as the average voltage can amazingly increases somewhat over the initial cycling over a moderate number of cycles of the battery, although at lower values of the charge voltage over cycling, the capacity is essentially flat. With appropriate selection of charge voltages, the capacity and average voltage plateau, and the capacity and average voltage can then be essentially stable out to many thousands of cycles before the capacity drops to 80% of the initial capacity. This is amazing cycling performance that is achieved with good values of specific capacities.

The batteries in the examples involve graphitic carbon active materials in the negative electrodes. However, the improved performance of the positive electrode active materials through the manipulation and appropriate stabilization of the materials can be extended to other negative electrode active materials that intercalate or alloy with lithium. The electrodes can be assembled into appropriate battery formats.

Outstanding performance results have been obtained for long term cycling out to thousands of cycles for both activated batteries and partially activated batteries. In particular, specific capacities have been obtained with at least about 100 mAh/g. Cycling stability has been obtained with respect to both battery capacity as well as average voltage. The cycling stability can be advantageous for application where long term performance is particularly important, such as for use in vehicles.

Lithium Ion Batteries

Lithium ion batteries generally comprise a positive electrode, a negative electrode, a separator between the negative electrode and the positive electrode and an electrolyte comprising lithium ions. The electrodes are generally associated with metal current collectors. Lithium ion batteries refer to batteries in which the negative electrode active material is a material that takes up lithium during charging and releases lithium during discharging. Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104. The basic battery structures and compositions are described in this section.

The nature of the negative electrode intercalation/alloying material influences the resulting voltage of the battery since the voltage is the difference between the half cell potentials at the cathode and anode. Suitable negative electrode (anode) lithium intercalation/alloying compositions can include, for example, graphite, synthetic graphite, coke, fullerenes, other graphitic carbons, niobium pentoxide, tin alloys, silicon, titanium oxide, tin oxide, and lithium titanium oxide, such as $Li_xTiO_2$, $0.5 \leq x \leq 1$ or $Li_{1+x}Ti_{2-x}O_4$, $0 \leq x \leq 1/3$. The graphitic carbon and metal oxide negative electrode compositions take up and release lithium through an intercalation or similar process. Silicon and tin alloys form alloys with the lithium metal to take up lithium and release lithium from the alloy to correspondingly release lithium. Additional negative electrode materials are described in published U.S. patent applications 2010/0119942 to Kumar, entitled "Composite Compositions, Negative Electrodes with Composite Compositions and Corresponding Batteries," and 2009/0305131 to Kumar et al., entitled "High Energy Lithium Ion Batteries with Particular Negative Electrode Compositions," both of which are incorporated herein by reference. Desirable elemental silicon based negative electrode active materials are described in published U.S. patent application number 2011/0111294 filed on Nov. 3, 2010 to Lopez et al., entitled "High Capacity Anode Materials for Lithium Ion Batteries," incorporated herein by reference. Desirable silicon oxide based negative electrode active materials are described in copending U.S. patent application Ser. No. 13/108,708 filed on May 16, 2011 to Deng et al., entitled "Silicon Oxide Based High Capacity Anode Materials for Lithium Ion Batteries," incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 kg/cm² (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, lithium bis-oxalato borate, and combinations thereof. Traditionally, the electrolyte comprises a 1 M concentration of the lithium salts, although greater or lesser concentrations can be used.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in published U.S. patent application 2011/0136019 filed on Dec. 4, 2009 to Amiruddin et al. (the '019 application), entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The batteries can comprise a single cathode structure or a plurality of cathode structures assembled in parallel and/or series electrical connection(s).

In some embodiments, the positive electrode and negative electrode can be stacked with the separator between them, and the resulting stacked structure can be placed into a cylindrical or prismatic configuration to form the battery structure. Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Figure 2:
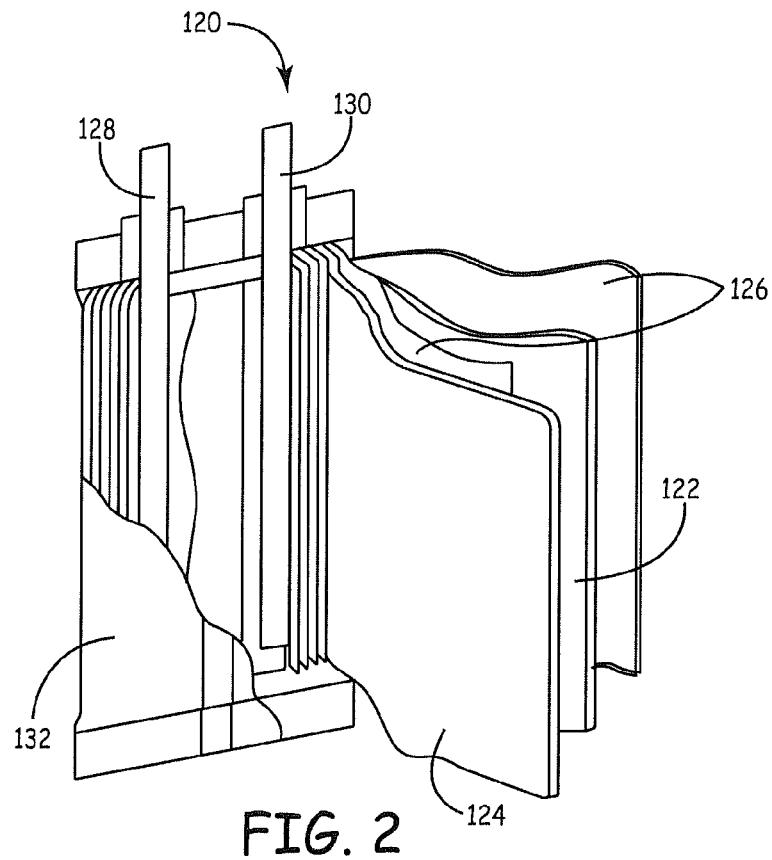
FIG. 2 is a schematic drawing of a pouch battery.

A schematic diagram of a pouch battery is shown in FIG. 2. Specifically, a pouch cell battery 120 is shown schematically having a negative electrode 122, a positive electrode 124 and a separator 126 between negative electrode 122 and positive electrode 124. A pouch battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 128, 130 associated respectively with negative electrode 122 and positive electrode 124. The stack of electrodes and separators can be enclosed in a laminated film casing 132. With respect to some specific embodiments, pouch batteries can be constructed as described in published U.S. patent application 2009/0263707 to Buckley et al, entitled "High Energy Lithium Ion Secondary Batteries", and copending U.S. patent application Ser. No. 13/195,672 filed on Aug. 1, 2011 to Kumar et al., entitled, "Battery Packs for Vehicles and High Capacity Pouch Secondary Batteries for Incorporation Into Compact Battery Packs," both of which are incorporated herein by reference.

Positive Electrode Active Compositions

The positive electrode active materials of particular interest comprise lithium rich compositions that generally are believed to form a layered composite crystal structure. In some embodiments, the lithium metal oxide compositions specifically comprise Ni, Co and Mn ions with an optional metal dopant. A lithium rich composition can be referenced relative to a composition $LiMO_2$, where M is one or more metals with an average oxidation state of +3. Generally, the lithium rich compositions can be represented approximately with a formula $Li_{1+x}M_{1-y}O_2$, where M represents one or more non-lithium metals, x≥0, and y is related to x based on the average valence of the metals. When x is greater than 0, the composition is lithium rich relative to the reference $LiMO_2$ composition. In some embodiments, x is from about 0.01 to about 0.33, and y is from about x−0.2 to about x+0.2 with the proviso that y≥0. In the layered-layered composite compositions, x is approximately equal to y. In general, the additional lithium in the lithium rich compositions is accessed at higher voltages such that the initial charge takes place at a relatively higher voltage to access the additional capacity. However, as described herein the material can undergo irreversible changes during an initial high voltage charge step, such that the material that cycles subsequent to the initial charge is not the same material that reacts at high voltage in the initial material.

Lithium rich positive electrode active materials of particular interest can be represented approximately by a formula $Li_{1+b}Ni_\alpha Mn_\beta Co_\gamma A_\delta O_{2-z}F_z$, where b ranges from about 0.01 to about 0.3, α ranges from about 0 to about 0.4, β range from about 0.2 to about 0.65, γ ranges from 0 to about 0.46, δ ranges from 0 to about 0.15 and z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li or combinations thereof. A person of ordinary skill in the art will recognize that additional ranges of parameter values within the explicit compositional ranges above are contemplated and are within the present disclosure. To simplify the following discussion in this section, the optional fluorine dopant is not discussed further. Desirable lithium rich compositions with a fluorine dopant are described further in published U.S. patent application 2010/0086854A to Kumar et al., entitled "Fluorine Doped Lithium Rich Metal Oxide Positive Electrode Battery Materials With High Specific Capacity and Corresponding Batteries," incorporated herein by reference. Compositions in which A is lithium as a dopant for substitution for Mn are described in published U.S. patent application 2011/0052989A to Venkatachalam et al., entitled "Lithium Doped Cathode Material," incorporated herein by reference. The specific performance properties obtained with +2 metal cation dopants, such as $Mg^{+2}$, are described in U.S. patent application Ser. No. 12/753,312, now U.S. Pat. No. 8,741,484 to Karthikeyan et al., entitled "Doped Positive Electrode Active Materials and Lithium Ion Secondary Batteries Constructed Therefrom," incorporated herein by reference.

If b+α+β+γ+δ is approximately equal to 1, the positive electrode material with the formula above can be represented approximately in two component notation as $xLi_2M'O_3 \cdot (1-x)LiMO_2$ where 0<x<1, M is one or more metal cations with an average valence of +3 within some embodiments at least one cation being a Mn ion or a Ni ion and where M' is one or more metal cations, such as $Mn^{+4}$, with an average valence of +4. As noted above, it is believed that the corresponding material has two distinct physical phases related to the separate components of the two component notation. The multi-phased material is believed to have an integrated layered-layered composite crystal structure with the excess lithium supporting the stability of the composite material. For example, in some embodiments of lithium rich materials, a $Li_2MnO_3$ material may be structurally integrated with a layered $LiMO_2$ component where M represents selected non-lithium metal elements or combinations thereof.

Recently, it has been found that the performance properties of the positive electrode active materials can be engineered around the specific design of the composition stoichiometry. The positive electrode active materials of particular interest can be represented approximately in two component notation as $xLi_2MnO_3\cdot(1-x)LiMO_2$, where M is one or more metal elements with an average valence of +3 and with one of the metal elements being Mn and with another metal element being Ni and/or Co. In general, $0<x<1$, but in some embodiments $0.03 \leq x \leq 0.55$, in further embodiments $0.075 \leq x \leq 0.50$, in additional embodiments $0.1 \leq x \leq 0.45$, and in other embodiments $0.15 \leq x \leq 0.425$. A person of ordinary skill in the art will recognize that additional ranges within the explicit ranges of parameter x above are contemplated and are within the present disclosure. For example, M can be a combination of nickel, cobalt and manganese, which, for example, can be in oxidation states $Ni^{+2}$, $Co^{+3}$, and $Mn^{+4}$ within the initial lithium manganese oxides. The overall formula for these compositions can be written as $Li_{2(1+x)/(2+x)}Mn_{2x/(2+x)}M_{(2-2x)/(2+x)}O_2$. In the overall formula, the total amount of manganese has contributions from both constituents listed in the two component notation. Thus, in some sense the compositions are manganese rich.

In some embodiments, M can be written as $Ni_uMn_vCo_wA_y$. For embodiments in which $y=0$, this simplifies to $Ni_uMn_vCo_w$. If M includes Ni, Co, Mn, and optionally A the composition can be written alternatively in two component notation and single component notation as the following.

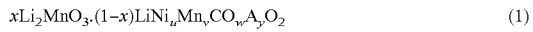

$$xLi_2MnO_3\cdot(1-x)LiNi_uMn_vCo_wA_yO_2 \quad (1)$$

$$Li_{1+b}Ni_\alpha Mn_\beta Co_\gamma A_\delta O_2, \quad (2)$$

with $u+v+w+y \approx 1$ and $b+\alpha+\beta+\gamma+\delta \approx 1$. The reconciliation of these two formulas leads to the following relationships:

$$b=x/(2+x),$$

$$\alpha=2u(1-x)/(2+x),$$

$$\beta=2x/(2+x)+2v(1-x)/(2+x),$$

$$\gamma=2w(1-x)/(2+x),$$

$$\delta=2y(1-x)/(2+x),$$

and similarly, $$x=2b/(1-b),$$

$$u=\alpha/(1-3b),$$

$$v=(\beta-2b)/(1-3b),$$

$$w=\gamma/(1-3b),$$

$$y=\delta/(1-3b).$$

In some embodiments, it may be desirable to have $u \approx v$, such that $LiNi_uMn_vCo_wA_yO_2$ becomes approximately $LiNi_uMn_u\text{-}Co_wA_yO_2$. In this composition, when $y=0$, the average valence of Ni, Co and Mn is +3, and if $u \approx v$, then these elements can have valences of approximately $Ni^{+2}$, $Co^{+3}$ and $Mn^{+4}$ to achieve the average valence. When the lithium is hypothetically fully extracted, all of the elements go to a +4 valence. A balance of Ni and Mn can provide for Mn to remain in a +4 valence as the material is cycled in the battery. This balance avoids the formation of $Mn^{+3}$, which has been associated with dissolution of Mn into the electrolyte and a corresponding loss of capacity. However, this perspective assumes maintenance of the two distinct phases with the phases remaining stable as the battery is cycled, and a more intricate view is described herein.

In further embodiments, the composition can be varied around the formula for the material with balanced amounts of Mn and Ni in the $LiMO_2$ phase of the material such that the approximate formula for the material is $xLi_2MnO_3\cdot(1-x)LiNi_{u+\Delta}Mn_{u-\Delta}Co_wA_yO_2$, where the absolute value of $\Delta$ generally is no more than about 0.3 (i.e., $-0.3 \leq \Delta \leq 0.3$), in additional embodiments no more than about 0.2 ($-0.2 \leq \Delta \leq 0.2$) in some embodiments no more than about 0.175 ($-0.175 \leq \Delta \leq 0.175$) and in further embodiments no more than about 0.15 ($-0.15 \leq \Delta \leq 0.15$). With $2u+w+y \approx 1$, desirable ranges of parameters are in some embodiments $0 \leq w \leq 1$, $0 \leq u \leq 0.5$, $0 \leq y \leq 0.1$ (with the proviso that both $u+\Delta$ and w are not zero), in further embodiments, $0.1 \leq w \leq 0.6$, $0.1 \leq u \leq 0.45$, $0 \leq y \leq 0.075$, and in additional embodiments $0.2 \leq w \leq 0.5$, $0.2 \leq u \leq 0.4$, $0 \leq y \leq 0.05$. A person of ordinary skill in the art will recognize that additional ranges of composition parameters within the explicit ranges above are contemplated and are within the present disclosure. As used herein, the notation (value1≤variable≤value2) implicitly assumes that value 1 and value 2 are approximate quantities. The engineering of the composition to obtain desired battery performance properties is described further in the '981 application cited above.

In general, various processes can be performed for synthesizing the desired lithium rich metal oxide materials described herein having nickel, cobalt, manganese and additional optional metal cations in the composition and exhibiting the high specific capacity performance. In particular, for example, sol gel, co-precipitation, solid state reactions and vapor phase flow reactions can be used to synthesize the desired materials. In addition to the high specific capacity, the materials can exhibit a good tap density which leads to high overall capacity of the material in fixed volume applications. Specifically, lithium rich metal oxide compositions were used in coated forms to generate the results in the Examples below.

Specifically, the synthesis methods based on co-precipitation have been adapted for the synthesis of compositions with the formula $Li_{1+b}Ni_\alpha Mn_\beta Co_\gamma A_\delta O_{2-z}F_z$, as described above. In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed at a second higher temperature to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in published U.S. patent application 2010/0086853A (the '853 application) to Venkatachalam et al. entitled "Positive Electrode Material for Lithium Ion Batteries Having a High Specific Discharge Capacity and Processes for the Synthesis of these Materials", incorporated herein by reference. Further details of the carbonate co-precipitation process are described in published U.S. patent application 2010/0151332A (the '332 application) to Lopez et al. entitled "Positive Electrode Materials for High Discharge Capacity Lithium Ion Batteries", both incorporated herein by reference.

Coatings and Formation of Coatings on Positive Electrode Active Materials

Inorganic coatings, such as metal halide coatings and metal oxide coatings, on lithium rich positive electrode active materials have been found to significantly improve the performance of lithium ion batteries, although the coatings are believed to be inert with respect to battery cycling. In particular, the cycling properties of the batteries formed from coated lithium metal oxides have been found to significantly improve from the uncoated material. Additionally, the specific capacity of the batteries also shows desirable properties with the coatings, and the irreversible capacity loss of the first cycle of the battery can be reduced in some embodiments. These performance improvements can be similarly exploited in the improved cycling described herein.

With respect to metal oxide and metal halide coatings, a coating with a combination of metal and/or metalloid elements can be used for the coating compositions. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. Metal fluoride coatings are described generally in published PCT application WO 2006/109930A to Sun et al., entitled "Cathode Active Materials Coated with Fluorine Compound for Lithium Secondary Batteries and Method for Preparing the Same," incorporated herein by reference. It has been found that metal/metalloid fluoride coatings can significantly improve the performance of lithium rich layered compositions for lithium ion secondary batteries. See, for example, the '853 application and the '332 application cited above, as well as published U.S. patent application number 2011/0111298 (the '298 application) to Lopez et al., entitled "Coated Positive Electrode Materials For Lithium Ion Batteries," incorporated herein by reference. Desirable performance results for non-fluoride metal halide coatings have been described in U.S. patent application Ser. No. 12/888,131, now U.S. Pat. No. 8,663,849 to Venkatachalam et al., entitled "Metal Halide Coatings on Lithium Ion Battery Positive Electrode Materials and Corresponding Batteries," incorporated herein by reference. This patent application also discusses methods for formation of desired metal halide coatings.

An increase in capacity and a reduction in irreversible capacity loss were noted with $Al_2O_3$ coatings by Wu et al., "High Capacity, Surface-Modified Layered $Li[Li_{(1-x)/3}Mn_{(2-x)/3}Ni_{x/3}Co_{x/3}]O_2$ Cathodes with Low Irreversible Capacity Loss," Electrochemical and Solid State Letters, 9 (5) A221-A224 (2006), incorporated herein by reference. The use of a $LiNiPO_4$ coating to obtain improved cycling performance is described in an article to Kang et al. "Enhancing the rate capability of high capacity $xLi_2MnO_3(1-x)LiMO_2$ (M=Mn, Ni, Co) electrodes by $Li—Ni—PO_4$ treatment," Electrochemistry Communications 11, 748-751 (2009), incorporated herein by reference, and this article can be referenced generally with respect to the formation of metal phosphate coatings. Desirable properties of metal oxide coatings on lithium rich positive electrode active materials are described further in published U.S. patent application 2011/0076556A to Karthikeyan et al., entitled "Metal Oxide Coated Positive electrode Materials for Lithium-Based Batteries," incorporated herein by reference.

In some embodiments, the coating improves the specific capacity of the batteries even though the coating itself is not electrochemically active. However, the coatings also influence other properties of the active material, such as the average voltage, thermal stability and impedance. The selection of the coating properties can incorporate additional factors related to the overall range of properties of the material.

In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of coating materials to achieve desired improvement in battery performance can be related to the particle size and surface area of the uncoated material. Further discussion of the effects of coating thickness on the performance properties for coated lithium rich lithium metal oxides is found in the '298 application cited above.

A metal fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, $NH_4F$ can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere.

An oxide coating is generally formed through the deposition of a precursor coating onto the powder of active material. The precursor coating is then heated to form the metal oxide coating. Suitable precursor coating can comprise corresponding metal hydroxides, metal carbonates or metal nitrates. The metal hydroxides and metal carbonate precursor coating can be deposited through a precipitation process since the addition of ammonium hydroxide and/or ammonium carbonate can be used to precipitate the corresponding precursor coatings. A metal nitrate precursor coating can be deposited through the mixing of the active cathode powder with a metal nitrate solution and then evaporating the solution to dryness to form the metal nitrate precursor coating. The powder with a precursor coating can be heated to decompose the coating for the formation of the corresponding metal oxide coating. For example, a metal hydroxide or metal carbonate precursor coating can be heated to a temperature from about 300° C. to about 800° C. for generally from about 1 hr to about 20 hrs. Also, a metal nitrate precursor coating generally can be heated to decompose the coating at a temperature from about 250° C. to about 550° C. for at least about 30 minutes. A person of ordinary skill in the art can adjust these processing conditions based on the disclosure herein for a specific precursor coating composition.

Cycling of Batteries with Activation

For lithium ion batteries formed with lithium rich positive electrode active materials, an initial charge of the battery to a voltage of about 4.45V or greater is found to activate a substantial fraction of the high voltage phase of the active material and to correspondingly drive irreversible changes to the positive electrode active material. If it is desired to essentially fully activate the material, the battery can be initially charged to about 4.6V or greater voltage, to limit the amount of additional gradual activation over the first several cycles of the battery. Thus, generally full activation can be accomplished with a charge to a voltage of at least about 4.45V, in other embodiments over a voltage in the range of about 4.45V to about 5.0V, and in further embodiments from about 4.475 to about 4.8V. A person of ordinary skill in the art will recognize that additional voltage ranges within the explicit ranges above are contemplated and are within the present disclosure.

Once the battery is activated, the initially formed active material, which is denoted above as ($MnO_2$), cycles with a relatively high average voltage and specific capacity. However, further cycling of the battery can result in additional structural changes to the active material that can gradually reduce the battery capacity as well as the average voltage. It has been discovered that lowering the charge voltage to a value of no more than about 4.25V during cycling of the activated battery can result in a capture of a significant fraction of the discharge capacity while dramatically reducing further degradation of capacity with cycling while also stabilizing the average voltage of the material. To achieve a desired fraction of the capacity, the charge voltage can be selected to be no more than about 4.25V, in some embodiments from about 3.8V to about 4.25V, in further embodiments from about 3.9V to about 4.24V, and in additional embodiments from about 4.0V to about 4.23V. A person of ordinary skill in the art will recognize that additional voltage ranges within the explicit ranges above are contemplated and are within the present disclosure.

For active materials that are cycled to charge voltages from about 4.25V to about 4.375 V, the materials are observed to undergo at least partially reversible losses of capacity if the discharge voltage during cycling is no less than about 2.9V. In further embodiments, the charge voltage can be in the range from about 4.25V to about 4.35V, in other embodiment from about 4.25V to about 4.34V and in additional embodiments from about 4.25V to about 4.34V. Of course, in actual use, a decision can be made to recharge the battery before the battery is discharged below a certain voltage. The battery can then be managed to ensure at least occasional discharge below a certain voltage, as described further below. In some embodiments, the at least occasional discharge voltage can be no more than about 2.8V, in other embodiments no more than about 2.75V and in additional embodiments from about 1.5V to about 2.6V. A person of ordinary skill in the art will recognize that additional ranges of charge voltages and discharge voltages within the explicit ranges above are contemplated and are within the present disclosure. The reversible changes to the active material observed at an intermediate charge voltage can be recovered in significant part through subsequent discharge to a lower voltage.

Figure 3:
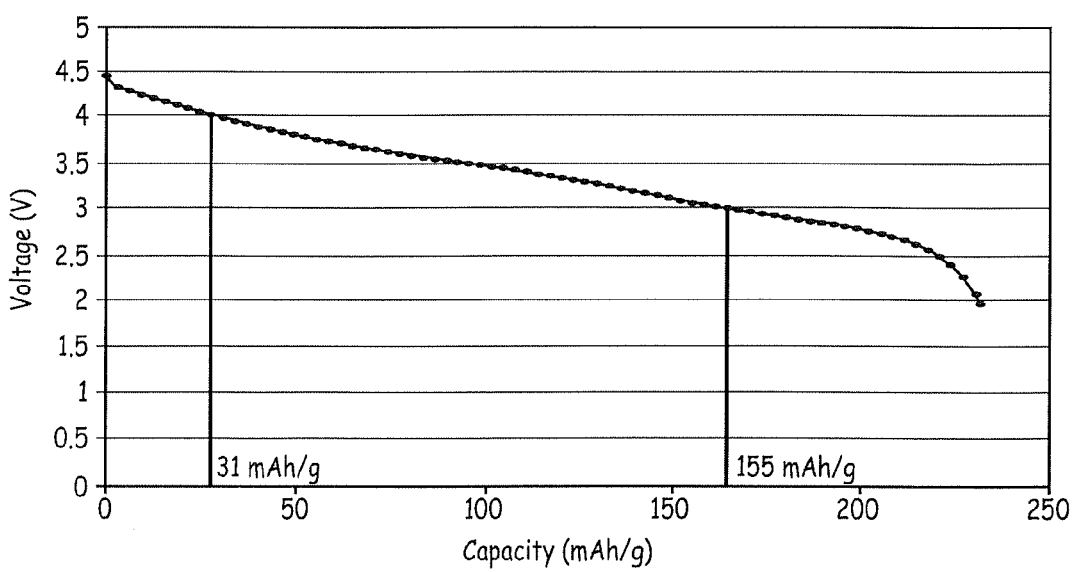
FIG. 3 is a plot of voltage as a function of specific capacity for a discharge from 4.5V to 2V at a rate of C/3, which can be used to roughly estimate available capacity over a selected voltage window for cycling.

For an activated battery, plot of the voltage as a function of discharge capacity is shown in FIG. 3 for a discharge at a rate of C/3. As shown in FIG. 3, battery capacity can be delivered over a wide voltage range following activation of the battery. In particular, the battery had a specific discharge capacity of about 230 mAh/g when discharged from about 4.5 V to about 2.0V. The plot is relatively linear with an approximately constant slope over most of the capacity range, although the plot turns downward below about 2.5 V. In view of the selection of a voltage window for stable long term cycling of an activated batter as described herein, the plot in FIG. 3 can provide some rough guidance with respect to the capacity available over a particular voltage range. For example, if a cycling voltage window is selected that discharges the battery from 4.0 V to about 3.0 V, as indicated by the vertical lines in FIG. 3, the battery would have a discharge capacity of about 124 mAh/g.

As noted above, several irreversible changes take place in a lithium ion battery during the first cycle, especially during the first charge, and this cycle can be referred to as the formation cycle. It has been previously found that a two step formation cycle can be advantageous for batteries having a lithium rich active material that is charged to a high voltage during the formation cycle. In particular, the battery can be first charged to a lower voltage of no more than about 4.3V, then letting the battery rest in an open voltage format before charging the battery to a second voltage of at least about 4.35 V. This improved formation protocol is described further in the '520 application cited above. Based on the results described herein, a consistent explanation of the two step formation protocol is that irreversible changes to the negative electrode take place during the first charge step while a lower voltage phase of the positive electrode active material has lithium extracted. During the second step of the formation, the higher voltage phase of the positive electrode active material is activated and at least a substantial portion of the irreversible changes to the positive electrode active material take place during the second charge step. While not wanting to be limited by theory, the second step can schematically involve the reaction of a $Li_2MnO_3$ phase of the material to form ($MnO_2$) with the release of molecular oxygen, which is observed in the second charge step.

Following activation of the battery, as the charge voltage is lowered, a greater portion of the specific battery capacity is given up in exchange for cycling stability. In other words, the specific capacity of the battery is less if the charge voltage is lowered, although the cycling stability can be greater. The cycling stability generally can also depend slightly on the particular stoichiometry of the positive electrode active material and on the charge and discharge rates, although the effects on cycling stability of the charge and discharge rate are observed generally to be small over rates from about C/5 to about 2C. Thus, the capacity and average voltage are found to exhibit outstanding stability with cycling with moderately high capacities. For activated batteries, design targets of maintenance of 80% of initial capacity for at least 2000 cycles can be achieved with a fixed charge voltage. For these charge ranges, it is found that the performance is relatively insensitive to the discharge voltage, although of course some capacity is not used if the discharge voltage is raised. The voltage window for cycling, especially the charge voltage, can be changed during cycling to increase the capacity and further extend battery life, as described further below.

As noted above, for activated batteries, stable cycling can be accomplished with greater charge voltages if the discharge voltage is a lower value. With charge voltages in an intermediate range between 4.25V and 4.35V, stable cycling can be obtained with a discharge to a voltage of no more than about 2.9V. The loss of capacity during cycling resulting from a charge to this intermediate voltage range is at least partially reversible if a subsequent discharge is taken to value of no more than about 2.9V. A similar observation was made earlier, and a cycling protocol to take advantage of this observation is described in the '520 application cited above. Significant further understanding of the boundaries of the cycling improvement is described herein. Furthermore, through the selection of a reduced charge voltage, the discharge to a sufficiently low voltage can stabilize the capacity and average voltage dramatically relative to cycling performance obtained with high charge voltages.

In particular, it can be desirable to discharge the battery at least occasionally or periodically to a value of no more than about 2.9 volts, and other discharge voltage ranges are given above. If allowed by the battery management system and matched with the usage style of the user, the battery can be routinely discharged sufficiently. However, the battery management system can be programmed to necessarily discharge the battery to a target low value according to a prescribed protocol. The discharge can be performed, for example, with a controlled discharge shunt to dissipate the discharged energy in a controlled manner. For example, the battery management system can be have a protocol that discharges the battery to the target low voltage at least one cycle of every 200 cycles, in some embodiments at least one cycle every 150 cycles, in further embodiments at least one cycle every 125 cycles, and in other embodiments at least one cycle every 100 cycles. A person or ordinary skill in the art will recognize that additional ranges of period for discharging the battery within the specific ranges above are contemplated and are within the present disclosure. Further information on battery management systems to accomplish this form of battery management are described in the '520 application.

For embodiments in which the results are not sensitive to the lower discharge cutoff, the cycling advantages can be directly exploited in commercial applications in which a user may select the discharge voltage cutoff based on their own usage behavior and their personal choice. For embodiments in which reversible changes are observed and longer cycling can be improved through at least occasional discharge to sufficiently low discharge values, a battery pack control system has been described that at least occasionally ensures that the discharge voltage is selected to be sufficiently low to result in an increase in the discharge capacity. In either case, the cycling can be selected to achieve a relatively high capacity with excellent cycling stability.

Cycling of Batteries With Partial and/or Gradual Activation

If the batteries with the lithium rich cathode active materials are not initially charged to substantially activate the high voltage active phase of the material, the high voltage phase can be partially activated during an initial charge and/or gradually activated during cycling to achieve unprecedented cycling stability with moderately high discharge capacities. Control of the activation can be achieved through charging of the battery to values generally between about 4.225V and about 4.45V. Within this range, the voltage can be raised to achieve greater activation of the high voltage phase and lowered to reduce the activation of the high voltage phase. Thus, an initially greater charge voltage can be used to initially partially activate the active material. During subsequent cycling, the charge voltage may or may not be selected to further gradually activate the active material during cycling. Thus, the initial charge voltage may or may not be the same as the charge voltage during subsequent cycling and, the voltage window during cycling can be changed for specific cycles or for subsequent cycling to achieve desired discharge capacities. Based on partial and/or gradual (partial/gradual) activation, discharge capacity fade to 80% of the initial capacity can be extended out to thousands of cycles while maintaining the average voltage with little decay.

The partial activation of a high voltage phase of the lithium rich positive electrode active material can take place if the initial charge voltage is between 4.225V and 4.45V, in further embodiments from about 4.24V to about 4.4V and in additional embodiments from about 4.25V to about 4.375V. A person of ordinary skill in the art will recognize that additional voltage ranges within the explicit ranges above are contemplated and are within the present disclosure. The partial activation of the high voltage active phase provides an increase of the specific discharge capacity due to the activation of the material to provide an appropriate cycling phase. If the battery is then cycled over a suitable voltage window, the positive electrode active material can be very stable for subsequent cycling. In particular, if the battery is cycled with a low enough charge voltage, the battery discharge capacity and average voltage can be very stable while achieving moderate values of specific discharge capacity.

In general, the charge voltage may or may not be reduced after the first cycle, which can result in the further stabilization of the cycling. If the active material is sufficiently activated during the first charge, i.e., formation step, then a subsequent charge voltage can be selected that provides little or no further activation of the high voltage phase of the active material during cycling. At these voltages, the partially activated positive electrode active material at most only very slowly undergoes further phase changes since the material can cycle a large number of cycles without significant loss of discharge capacity or average voltage.

In alternative or additional embodiments, the charge voltage during cycling can be reduced somewhat relative to the initial charge voltage, but the charge voltage during cycling can still gradually activate the high voltage phase of the positive electrode active material during cycling. The gradual activation can correspondingly gradually increase capacity with cycling, which can compensate for some fade or can actually result in significantly increasing capacity over a significant number of cycles. The charge voltage can be adjusted to achieve a desired degree of gradual activation. The voltages for gradual activation can be lower than voltages that correspondingly result in significant degradation of the performance through the destabilization of the activated material. Thus, the activated capacity of the material can be maintained over a very large number of cycles with gradual activation.

Generally, for cycling with gradual activation and/or initial partial activation, the battery can be cycled with a charge voltage from about 4.05V to about 4.35V, in further embodiment from about 4.075V about 4.325V and in additional embodiments from about 4.1V to about 4.3V. A person of ordinary skill in the art will realize that additional ranges within the explicit charge voltage ranges are contemplated and are within the present disclosure.

A significant advantage of the partial and/or gradual activation procedures is that the release of oxygen during the formation cycle is significantly reduced. The release of oxygen during the formation cycle can introduce additional processing steps and complication the completion of a commercial battery. Through the reduction of the oxygen release during the formation cycle, production costs can be reduced. Also, as described below, with partial/gradual activation, the performance of the battery can be extended for both discharge capacity and average voltage out to thousands of cycles before there is a drop of 80% relative to initial values. In general, since the performance is not significantly dependent on the lower cutoff in discharge voltage, the outstanding performance results can be exploited in commercial applications in which the discharge cutoff may be controlled by a user at varying voltage values, which can be based on extent use and selective choices by the user.

Battery Performance and Cycling Properties

Based on the principles described herein, outstanding cycling performance has been achieved with activation or with partial/gradual activation, at moderate discharge capacities and stable average voltage. In general, the cycling discharge capacity can be evaluated based on the number of cycle until the capacity reaches about 80% of the initial cycling discharge capacity at the same discharge rate. In addition, it is desirable for the average discharge voltage to remain within, for example, about 85% of the initial average voltage so that energy availability can exhibit appropriately low fade with cycling. Based on the result described herein, with activation, batteries can be cycled to roughly 5000 cycles or more based on reasonable extrapolations before reaching the 80% capacity decrease at reasonable rates and capacities as well as appropriately stable average discharge voltages.

Similarly, with partial/gradual activation, the batteries can be cycled for roughly 25,000 cycles based on reasonable extrapolations before reaching the 80% drop in capacity at reasonable rates and capacities as well as appropriately stable average discharge voltages. To further extend the battery lifetime, the charge voltage can be increased at a larger number of cycles to boost the capacity to compensate for some capacity fade. Thus, the increase in charge voltage can have relatively small increments in value, such as from about 0.01V to about 0.25V and in further embodiments from about 0.025V to about 0.15V, which can be incremented, for example, after 500 cycle, 1000 cycles, 2000 cycles or 2500 cycles, and can be performed once or repeated after sufficient cycling. A person of ordinary skill in the art will recognize that additional ranges within the explicit ranges related to incremental voltage increases above are contemplated and are within the present disclosure.

With respect to specific discharge capacity, an activated battery can have a specific discharge capacity, relative to the weight of the positive electrode active material, of at least about 100 mAh/g, in other embodiments at least about 110 mAh/g and in further embodiments at least about 115 mAh/g when discharged from 4.1V to 2.0V at a rate of C/3. In addition, after activation, the batteries can exhibit a discharge capacity at 500 cycles that is at least about 85% and in further embodiments at least about 90% of the 5th cycle discharge capacity when discharged at a rate of C/3 when discharged from 4.25V to 2.0V. The average voltage values are sensitive to composition and voltage window for cycling. However, the stability of the average voltage can be very good for an activated batter and may actually increase slightly with cycling. In particular, an activated battery discharged from 4.25V to 2.0V can exhibit at least about 87.5% at 500 cycles of the 5th cycle average discharge voltage, in additional embodiments at least about 90% and in further embodiments at least about 90% when discharged at a rate of C/3. A person of ordinary skill in the art will recognize that additional ranges of performance of activated batteries within the explicit ranges above are contemplated and are within the present disclosure.

In use, an activated battery is charged to a selected voltage and generally discharged to selected degrees before recharging. In general, a reasonable charge voltage can be selected within a range, and suitable performance can be selected without significant dependence on the discharge voltage over suitable ranges. Also, as shown herein, the fade is not significantly dependent on the discharge rate. Therefore, performance fade can be referenced over a range of charge voltages and discharge rates to describe the outstanding cycling described herein. Thus, for activated batteries, the batteries after formation can be cycled with a charge voltage within ranges described above at an average rate from C/5 to about 2C such that the capacity after 2000 cycles is at least about 80 percent of the discharge capacity at the fifth cycle, in further embodiments at least about 82.5 percent and in other embodiments at least about 85% of the discharge capacity at the fifth cycle at the same average rate. Similarly, for activated batteries, the batteries after formation can be cycled with a charge voltage within ranges described above at an average rate from C/5 to about 2C such that the average discharge voltage after 2000 cycles is at least about 85 percent of the average voltage at the fifth cycle, in further embodiments at least about 87.5 percent and in other embodiments at least about 90% of the average voltage at the fifth cycle at the same average rate. A person of ordinary skill in the art will recognize that subranges within the explicit ranges cycling performance parameters above are contemplated and are within the present disclosure.

With respect to the performance of partially activated batteries, the capacity can actually increase with cycling over a moderate number of cycles as the battery continues gradual activation. With adjustment of the partial activation voltage and the cycling voltage, extremely flat capacities can be obtained out to several thousands of cycles. Thus, batteries with partial/gradual activation can achieve at least about 100 mAh/g in other embodiments at least about 110 mAh/g, in further embodiments at least about 120 mAh/g, and in additional embodiments from about 125 to about 145 mAh/g when discharged from 4.25V to 2.0V at a rate of C/3 at the 500th discharge cycle, based on the weight of the positive electrode active material. The batteries can exhibit a coulombic efficiency corresponding to a capacity at the 500th discharge cycle that is at least about 90%, in further embodiments at least about 92.5% in other embodiments at least about 95%, in additional embodiments at least about 97.5% relative to the 5th cycle discharge capacity when discharged at a rate of C/3 from 4.25V to 2.0V. Similarly, the batteries can exhibit a coulombic efficiency corresponding to a capacity at the 1000th discharge cycle that is at least about 87.5%, in further embodiments at least about 90%, in additional embodiments at least about 92.5% and in other embodiments at least about 95% relative to the 5th cycle discharge capacity when discharged at a rate of 2C from 4.25V to 2.0V. Also, the batteries can exhibit a coulombic efficiency corresponding to a capacity at the 2500th discharge cycle that is at least about 87%, in further embodiments at least about 90%, and in other embodiments at least about 92.5% relative to the 5th cycle discharge capacity when discharged at a rate of 2C from 4.25V to 2.0V. Furthermore, a battery with partial/gradual activation discharged from 4.25V to 2.0V can exhibit at least about 87.5% at 500 cycles of the 5th cycle average voltage, in additional embodiments at least about 90%, in other embodiments at least about 92.5% and in further embodiments at least about 95% when discharged at a rate of C/3. Similarly, a battery with partial/gradual activation discharged from 4.25V to 2.0V can exhibit at least about 85% at 1000 cycles of the 5th cycle average voltage, in additional embodiments at least about 90% and in further embodiments at least about 95% when discharged at a rate of 2C. Also, a battery with partial/gradual activation discharged from 4.25V to 2.0V can exhibit at least about 85% at 2500 cycles of the 5th cycle average voltage, in additional embodiments at least about 90% and in further embodiments at least about 95% when discharged at a rate of 2C. A person of ordinary skill in the art will recognize that additional ranges of performance of batteries with partial/gradual activation within the explicit ranges above are contemplated and are within the present disclosure.

In use, a partially activated battery is charged to a selected voltage and generally discharged to selected degrees before recharging. In general, a reasonable charge voltage can be selected within a range, and suitable performance can be selected without significant dependence on the discharge voltage over suitable ranges. Also, as shown herein, the fade is not significantly dependent on the discharge rate. Therefore, performance fade can be referenced over a range of charge voltages and discharge rates to describe the outstanding cycling described herein. Thus, for activated batteries, the batteries after formation can be cycled with a charge voltage within ranges described above at an average discharge rate from C/5 to about 2C such that the capacity after 2000 cycles is at least about 80 percent of the discharge capacity at the fifth cycle, in further embodiments at least about 82.5 percent and in other embodiments at least about 85% of the discharge capacity at the fifth cycle at the same average rate. Similarly, for partially activated batteries, the batteries after formation can be cycled with a charge voltage within ranges described above at an average rate from C/5 to about 2C such that the average discharge voltage after 2000 cycles is at least about 85 percent of the average voltage at the fifth cycle, in further embodiments at least about 87.5 percent and in other embodiments at least about 90% of the average voltage at the fifth cycle at the same average rate. A person of ordinary skill in the art will recognize that subranges within the explicit ranges cycling performance parameters above are contemplated and are within the present disclosure.

The batteries can be cycled over 2000 cycles while achieving low levels of manganese in the negative electrode, which indicates a low amount of manganese dissolution from the positive electrodes with cycling. In particular, at 2000 cycles over an appropriate voltage window to achieve at least about 100 mAh/g based on the positive electrode weight, the negative electrode can have amounts of no more than about 1 weight percent, in further embodiments no more than about 2500 parts per million by weight (ppm) and in other embodiments no more than about 1000 ppm. A person of ordinary skill in the art will recognize that additional ranges of manganese concentrations within the explicit ranges above are contemplated and are within the present disclosure.

EXAMPLES

Example 1

Synthesis of Cathode Active Material

This example demonstrates the formation of a desired positive electrode active material using a carbonate or hydroxide co-precipitation process. The materials were used for the formation of test batteries as described below.

Stoichiometric amounts of metal precursors were dissolved in distilled water to form an aqueous solution with the metal salts in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept between room temperature and 80° C. The pH of the reaction mixture was in the range from 6-12. In general, the aqueous transition metal solution had a concentration from 1M to 3M, and the aqueous $Na_2CO_3/NH_4OH$ solution had a $Na_2CO_3$ concentration of 1M to 4M and/or a $NH_4OH$ concentration of 0.2-2M. The metal carbonate or hydroxide precipitate was filtered, washed multiple times with distilled water, and dried at 110° C. for about 16 hrs to form a metal carbonate or hydroxide powder. Specific ranges of reaction conditions for the preparation of the samples are further outlined in Table 1, where the solution may not include both $Na_2CO_3$ and $NH_4OH$.

TABLE 1

| Reaction Process Condition | Values |
|---|---|
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ | 1-4M |
| Concentration of $NH_4OH$ | 0.2-2M |
| Flow rate of the metal salts | 1-100 mL/min |
| Flow rate of $Na_2CO_3$ & $NH_4OH$ | 1-100 mL/min |

An appropriate amount of Li$_2$CO$_3$ powder was combined with the dried metal carbonate or hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide, followed by an additional mixing step to further homogenize the powder. The further homogenized powder was again calcined to form the highly crystalline lithium composite oxide. Specific ranges of calcination conditions are further outlined in Table 2 (scfh is a standard cubic foot per hour).

TABLE 2

| | Calcination Process Condition | Values |
|---|---|---|
| 1$^{st}$ Step | Temperature | 400-800° C. |
| | Time | 1-24 hr |
| | protective gas | Nitrogen or Air |
| | Flow rate of protective gas | 0-50 scfh |
| 2$^{nd}$ Step | Temperature | 700-1100° C. |
| | time | 1-36 hr |
| | protective gas | Nitrogen or Air |
| | Flow rate of protective gas | 0-50 scfh |

The positive electrode composite material particles thus formed generally have a substantially spherical shape and are relatively homogenous in size. Two product compositions were formed for battery testing. The product composition was assumed to correspond to the portions of the metal reactants used to form the composition with the oxygen adjusting to yield the overall targeted oxidation state. The overall formula for these compositions can be written as $x$Li$_2$MnO$_3 \cdot (1-x)$LiNi$_u$Mn$_v$CO$_w$O$_2$. A first composition had $x=0.5$ and a second composition had $x=0.3$. A discussion of the synthesis and testing of a range of cathode active materials with similar stoichiometries can be found in published U.S. patent application 2011/0052981A to Lopez et al., entitled "Layer-Layer Lithium Rich Complex Metal Oxides With High Specific Capacity And Excellent Cycling," incorporated by reference herein.

Example 2

Formation of Coated Positive Electrode Materials

In some examples below, the lithium metal oxide (LMO) particles prepared in Example 1 were coated with a thin layer of aluminum halide (AlX$_3$) using a solution-based method, where X is F, except for materials used in Example 7 where X is Br. For a selected amount of aluminum halide coating, an appropriate amount of saturated solution of aluminum nitrate was prepared in an aqueous solvent. The metal oxide particles were then added into the aluminum nitrate solution to form a mixture. The mixture was mixed vigorously for a period of time to homogenize. The length of mixing depends on the volume of the mixture. After homogenization, a stoichiometric amount of ammonium halide, i.e., ammonium fluoride or ammonium bromide, was added to the homogenized mixture to form aluminum halide precipitate as a coating on the particles. Upon the completion of the precipitation, the mixture was stirred at about 80° C. for 3-10 h. The mixture was then filtered and the solid obtained was washed repeatedly to remove any un-reacted materials. The solid was calcined in nitrogen atmosphere at 300-600° C. for 3-10 h to form the aluminum halide coated metal oxide material.

Example 3

Battery Formation, Coin Cells and Pouch Batteries

This example demonstrates the formation of coin cell batteries and pouch batteries comprising a positive electrode comprising lithium metal oxide (LMO) and a negative electrode.

A positive electrode was formed from LMO oxide powders. LMO powders with an aluminum fluoride coating were synthesized as described in Examples 1 and 2. The LMO powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Sigma-Aldrich) and stirred overnight to form a PVDF-NMP solution. The homogeneous powder mixture was then added to the PVDF-NMP solution and mixed for about 2 hours to form homogeneous slurry. The slurry was applied onto an aluminum foil current collector to form a thin wet film and a positive electrode material was formed by drying the laminated current collector in a vacuum oven at 110° C. for about two hours to remove NMP. The positive electrode material was pressed between rollers of a sheet mill to obtain a positive electrode with desired thickness. The mixture comprised at least about 75 weight percent active metal oxide, at least about 3 weight percent acetylene black, at least about 1 weight percent graphite, and at least about 2 weight percent polymer binder.

A negative electrode was formed from graphitic carbon or elemental lithium. The graphitic carbon based negative electrodes comprised at least about 75 weight percent graphite and at least about 1 weight percent acetylene black with the remaining portion of the negative electrode being polymer binder. The acetylene black was initially mixed with NMP solvent to form a uniform dispersion. The graphite and polymer were added to the dispersion to form a slurry. The slurry was applied as a thin-film to a copper foil current collector. A negative electrode was formed by drying the copper foil current collector with the thin wet film in vacuum oven at 110° C. for about two hours to remove NMP. The negative electrode material was pressed between rollers of a sheet mill to obtain a negative electrode with desired thickness. Elemental lithium negative electrodes were formed from lithium foil (FMC Lithium) having thickness of 125-150 microns.

An electrolyte was selected to be stable at high voltages, and appropriate electrolytes are described in published U.S. patent application 2011/0136019 to Amiruddin et al., entitled "Lithium Ion Battery With High Voltage Electrolytes and Additives," incorporated herein by reference.

Coin cell batteries were formed by placing the positive electrode and negative electrode inside an argon filled glove box. A trilayer (polypropylene/polyethylene/polypropylene) micro-porous separator (2320 from Celgard, LLC, NC, USA) soaked with the selected electrolyte was placed between the positive electrode and the negative electrode. A few additional drops of the selected electrolyte were added between the electrodes. The electrodes were then sealed inside a 2032 coin cell hardware (Hohsen Corp., Japan) using a crimping process to form a coin cell battery. The resulting coin-cell battery was rested for 24 hours.

Pouch cell batteries were constructed with 22 negative electrode plates alternating with 21 positive electrode plates such that a negative electrode plate was positioned at both ends of the stack. Electrodes were formed as described above with the current collectors coating on both sides and with a portion of the aluminum and copper current collectors left uncoated to serve as tab attachment points. The negative electrodes had a surface area of about 3.1 cm×4.35 cm and the positive electrodes had a surface area of about 3 cm×4.25 cm. The positive and negative electrodes were alternately stacked and a single trilayer (polypropylene/polyethylene/polypropylene) micro-porous separator (2320 from Celgard, LLC, NC, USA) was folded in a Z-pattern with an appropriate electrode in each fold and a negative electrode at the surface of the folded structure so that a negative electrode is located at the ends of the stacks. Nickel and aluminum tabs were then attached to the negative and positive electrodes, respectively, and the stack was place in a pouch bag and sealed at three edges. Electrolyte was then added to the stack through the fourth, open edge and the fourth edge was then sealed. The battery was designed to have an approximate 1 Ah total capacity at full discharge.

Example 4

Initial Cycling Capacities of Activated Batteries

The batteries were activated through an initial charge to a voltage of 4.6V during the first battery charge. A two step high voltage charge was used in the activation step as described in the '520 application cited above.

To demonstrate the effect of activation on capacity and average discharge voltage, at small cycle number, coin cell batteries were formed as described in Example 3 above. In particular, four sets of batteries were formed, each set comprising six batteries. The batteries were fabricated from a lithium foil as the negative electrode and a positive electrode comprising coated LMO particles. Batteries from sets 1 and 2 were formed from positive electrodes with an active material having x=0.5. Batteries from sets 3 and 4 were formed from positive electrodes with an active material having x=0.3. Batteries from sets 1 and 3 were activated, while batteries from sets 2 and 4 were not activated. Batteries that were not activated were initially charged to the upper voltage of the voltage window for cycling. The batteries were cycled within specific cycling voltage windows at a rate of C/10, C/5, C/3, C, 2C, and 9 mA for cycles 1-5, 6-10, 11-15, 16-20, 21-25, and 25-30, respectively. Tables 3-6 display the particular cycling voltage window of each battery as well as specific discharge capacities and average discharge voltages at selected cycle numbers.

TABLE 3

| Voltage Window (Volts) | Set # | Specific Discharge Capacity (mAh/g) | | | | | |
|---|---|---|---|---|---|---|---|
| | | Cycle 1 | Cycle 5 | Cycle 10 | Cycle 15 | Cycle 20 | Cycle 15 | Cycle 30 |
| 2.7~4.4 | 1 | 290 | 243 | 234 | 229 | 198 | 171 | 147 |
| | 2 | 116 | 120 | 119 | 119 | 115 | 111 | 107 |
| 2.9~4.4 | 1 | 281 | 232 | 223 | 211 | 174 | 135 | 121 |
| | 2 | 116 | 118 | 117 | 117 | 113 | 109 | 106 |
| 3.1~4.4 | 1 | 273 | 216 | 203 | 183 | 145 | 124 | 112 |
| | 2 | 115 | 116 | 115 | 115 | 110 | 106 | 103 |
| 2.7~4.2 | 1 | 287 | 195 | 187 | 181 | 153 | 127 | 117 |
| | 2 | 89 | 90 | 89 | 88 | 85 | 80 | 78 |
| 2.9~4.2 | 1 | 284 | 19 | 183 | 174 | 139 | 117 | 112 |
| | 2 | 88 | 89 | 88 | 87 | 83 | 78 | 75 |
| 3.1~4.2 | 1 | 269 | 176 | 164 | 147 | 123 | 112 | 105 |
| | 2 | 87 | 88 | 87 | 86 | 82 | 77 | 75 |

TABLE 4

| Voltage Window (Volts) | Set # | Average Discharge Voltage (V) | | | | | |
|---|---|---|---|---|---|---|---|
| | | Cycle 5 | Cycle 10 | Cycle 15 | Cycle 20 | Cycle 15 | Cycle 30 |
| 2.7~4.4 | 1 | 3.59 | 3.58 | 3.56 | 3.53 | 3.49 | 3.48 |
| | 2 | 3.95 | 3.94 | 3.93 | 3.86 | 3.76 | 3.66 |
| 2.9~4.4 | 1 | 3.60 | 3.60 | 3.60 | 3.58 | 3.57 | 3.53 |
| | 2 | 3.97 | 3.97 | 3.95 | 3.88 | 3.78 | 3.72 |
| 3.1~4.4 | 1 | 3.65 | 3.66 | 3.67 | 3.70 | 3.65 | 3.60 |
| | 2 | 3.98 | 3.97 | 3.96 | 3.89 | 3.79 | 3.72 |
| 2.7~4.2 | 1 | 3.58 | 3.58 | 3.57 | 3.55 | 3.54 | 3.51 |
| | 2 | 3.93 | 3.92 | 3.91 | 3.84 | 3.72 | 3.67 |
| 2.9~4.2 | 1 | 3.60 | 3.60 | 3.60 | 3.63 | 3.59 | 3.54 |
| | 2 | 3.93 | 3.93 | 3.91 | 3.84 | 3.70 | 3.64 |
| 3.1~4.2 | 1 | 3.65 | 3.67 | 3.69 | 3.71 | 3.63 | 3.55 |
| | 2 | 3.95 | 3.94 | 3.93 | 3.87 | 3.77 | 3.72 |

TABLE 5

| Cycling Voltage Window (V) | Set # | Specific Discharge Capacity (mAh/g) | | | | | | |
|---|---|---|---|---|---|---|---|---|
| | | Cycle 1 | Cycle 5 | Cycle 10 | Cycle 15 | Cycle 20 | Cycle 15 | Cycle 30 |
| 2.7~4.4 | 3 | 217 | 191 | 176 | 181 | 166 | 157 | 145 |
| | 4 | 155 | 156 | 154 | 152 | 142 | 137 | 85 |
| 2.9~4.4 | 3 | | 156 | 153 | 153 | 145 | 139 | 134 |
| | 4 | 153 | 154 | 152 | 149 | 142 | 139 | 133 |
| 3.1~4.4 | 3 | 221 | 186 | 183 | 172 | 157 | 150 | |
| | 4 | 155 | 156 | 154 | 153 | 144 | 140 | |
| 2.7~4.2 | 3 | 228 | 171 | 166 | 158 | 148 | 140 | 134 |
| | 4 | 126 | 127 | 125 | 124 | 116 | 112 | 108 |
| 2.9~4.2 | 3 | 229 | 168 | 163 | 158 | 146 | 138 | 131 |
| | 4 | 124 | 125 | 124 | 121 | 114 | 109 | 105 |
| 3.1~4.2 | 3 | 219 | 161 | 156 | 150 | 139 | 133 | 128 |
| | 4 | 123 | 124 | 122 | 120 | 112 | 105 | 102 |

TABLE 6

| Cycling Voltage Window (V) | Set # | Average Discharge Voltage (V) | | | | | |
|---|---|---|---|---|---|---|---|
| | | Cycle 5 | Cycle 10 | Cycle 15 | Cycle 20 | Cycle 15 | Cycle 30 |
| 2.7~4.4 | 3 | 3.76 | 3.75 | 3.75 | 3.73 | 3.63 | 3.48 |
| | 4 | 3.92 | 3.91 | 3.90 | 3.43 | 3.30 | 3.02 |
| 2.9~4.4 | 3 | 3.92 | 3.91 | 3.90 | 3.83 | 3.72 | 3.62 |
| | 4 | 3.93 | 3.92 | 3.91 | 3.85 | 3.77 | 3.67 |
| 3.1~4.4 | 3 | 3.81 | 3.80 | 3.81 | 3.77 | 3.69 | |
| | 4 | 3.93 | 3.92 | 3.91 | 3.83 | 3.74 | |
| 2.7~4.2 | 3 | 3.72 | 3.73 | 3.73 | 3.70 | 3.62 | 3.53 |
| | 4 | 3.88 | 3.88 | 3.87 | 3.82 | 3.74 | 3.67 |
| 2.9~4.2 | 3 | 3.74 | 3.75 | 3.75 | 3.72 | 3.65 | 3.57 |
| | 4 | 3.89 | 3.89 | 3.88 | 3.82 | 3.74 | 3.67 |
| 3.1~4.2 | 3 | 3.76 | 3.77 | 3.77 | 3.74 | 3.67 | 3.60 |
| | 4 | 3.89 | 3.89 | 3.88 | 3.83 | 3.73 | 3.67 |

Referring to Tables 3-6, for the cycling voltage windows tested, it was generally observed that activation resulted in increased specific discharge capacities and decreased average discharge voltages relative to batteries that were not activated.

Example 5

Cycling Performance of Activated Batteries

This example demonstrates the longer cycling performance of activated coin cell batteries. Specifically, the example demonstrates the initial cycling capacities of activated cell coin cell batteries with graphitic carbon anode active materials. After an initial formation cycle, the batteries were cycled over a selected voltage window. The batteries were activated through an initial charge to a voltage of 4.6V during the first battery charge. A two step high voltage charge was used in the activation step as described in the '520 application cited above For this example, coin cell batteries were formed as described in Example 3 above. Each battery was formed from a negative electrode comprising graphitic carbon and a positive electrode comprising coated LMO particles. The batteries were formed from positive electrodes with an active material having x=0.5 or x=0.3. Prior to cycling, the batteries were charged to 4.6V using a formation protocol as described in Example 4 to activate the battery. After activation, the batteries were cycled within various fixed voltage windows at a rate of C/3. Batteries with x=0.5 and x=0.3 were cycled 350 and 1000 times, respectively. The effects of cycling voltage window on capacity retention and average discharge voltage were tested and the results are presented below.

Figure 4:
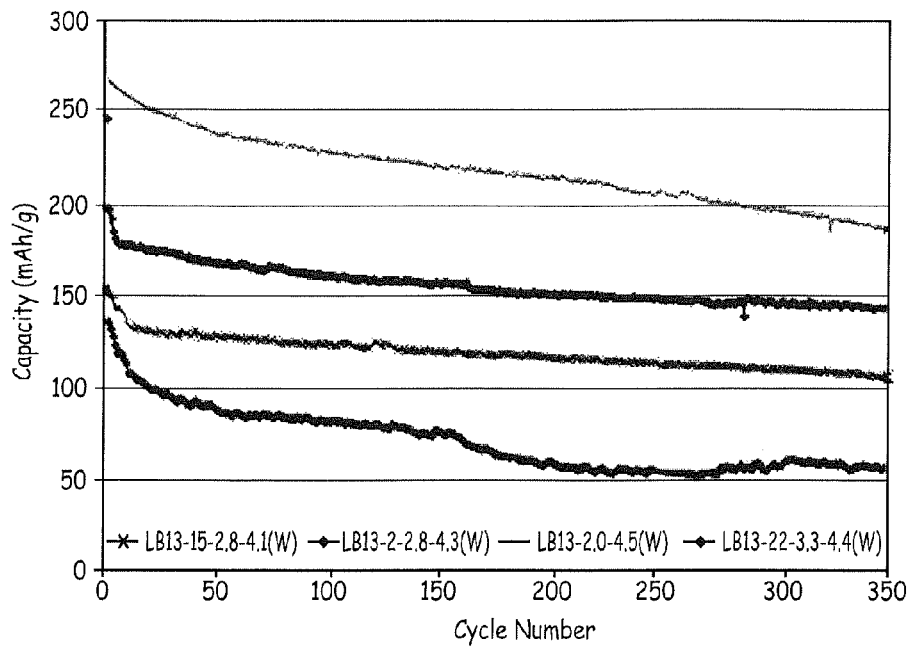
FIG. 4 is a graph containing plots of specific discharge capacity versus cycle number for fully activated batteries with x=0.5 and cycled between different cycling voltage windows.
Figure 5:
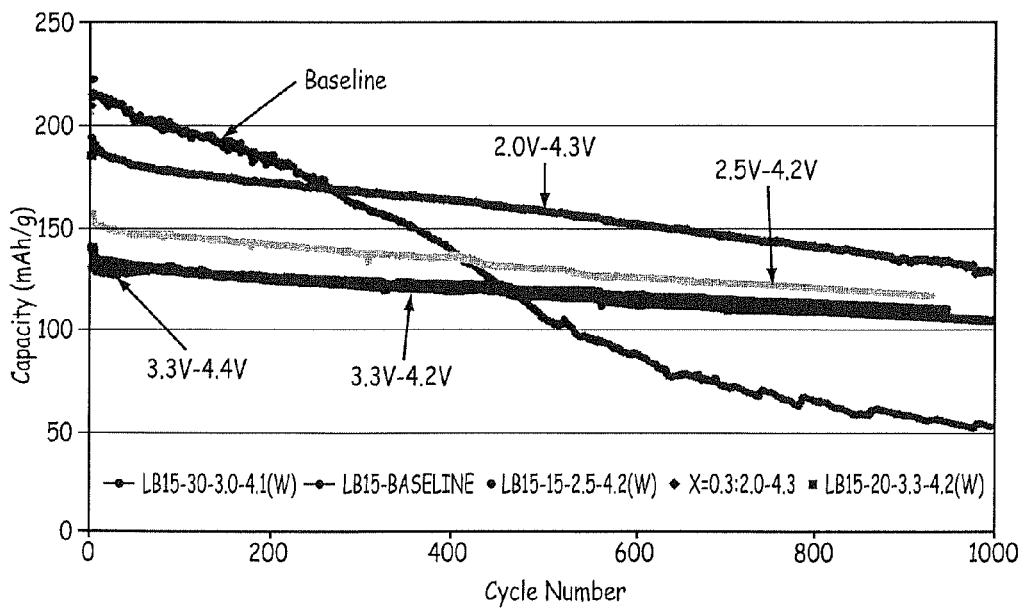
FIG. 5 is a graph containing plots of specific discharge capacity versus cycle number for activated batteries with x=0.3 and cycled between different cycling voltage windows.

The results of cycling on capacity retention are shown in FIG. 4 and Table 7 below for batteries with x=0.5. Specifically, FIG. 4 is graph containing plots of specific capacity versus cycle number for batteries with x=0.5. Analogous results for batteries with x=0.3 are shown in FIG. 5 and Table 8 below. Values in Tables 7 and 8 denoted with an "*" reflect predicted values based on an extrapolation from earlier cycles.

TABLE 7

| Cycling Voltage Window (V) | Specific Capacity (After 300 Cycles) (mAh/g) | Percent Capacity Retained |
|---|---|---|
| 2.0 to 4.0 | 115 | 80 |
| 2.0 to 4.5 | 224* | 86* |
| 2.5 to 4.4 | 180 | 87 |
| 2.6 to 4.3 | 163 | 87 |
| 2.8 to 4.1 | 115* | 86* |
| 2.8 to 4.3 | 153* | 86* |
| 3.0 to 4.1 | 96 | 84 |
| 3.0 to 4.3 | 106 | 74 |
| 3.1 to 4.1 | 105 | 82 |
| 3.1 to 4.2 | 106 | 80 |
| 3.1 to 4.4 | 87 | 65 |
| 3.2 to 4.3 | 91 | 71 |
| 3.3 to 4.4 | 57 | 52 |

TABLE 8

| Cycling Voltage Window | Specific Capacity (After 350 Cycles) (mAh/g) | Percent Capacity Retained |
|---|---|---|
| 2.0 to 4.5 | 153 | 73 |
| 2.5 to 4.2 | 140* | 94* |
| 2.8 to 4.4 | 143 | 81 |
| 3.0 to 4.1 | 123* | 97* |
| 3.1 to 4.2 | 122 | 88 |
| 3.1 to 4.3 | 117 | 76 |
| 3.1 to 4.4 | 94 | 56 |
| 3.3 to 4.2 | 124* | 94* |
| 3.3 to 4.4 | 122 | 70 |
| 3.4 to 4.35 | 104 | 80 |

With respect to batteries with an active material having x=0.5, all but 4 of the batteries had a capacity retention of 80% or greater after 350 cycles. The best performing battery from Table 7 over-all was the battery cycled between 2.0 V and 4.5 V which had a specific capacity of about 225 mAh/g and a capacity retention of about 86% after 350 cycles. With respect to batteries with an active material having x=0.3, again, all but 4 of the batteries had a capacity retention of 80% or greater after 350 cycles. In particular, the batteries cycled between 2.5 V and 4.2 V, 3.3 V and 4.2 V, and 3.0 V and 4.1V, all had a capacity retention of greater than 90%. Comparison between the batteries in Tables 7 and 8 cycled between 3.0 V and 4.1V reveals that the battery with x=0.3 had improved specific capacity and capacity retention relative the battery with x=0.5.

Figure 6:
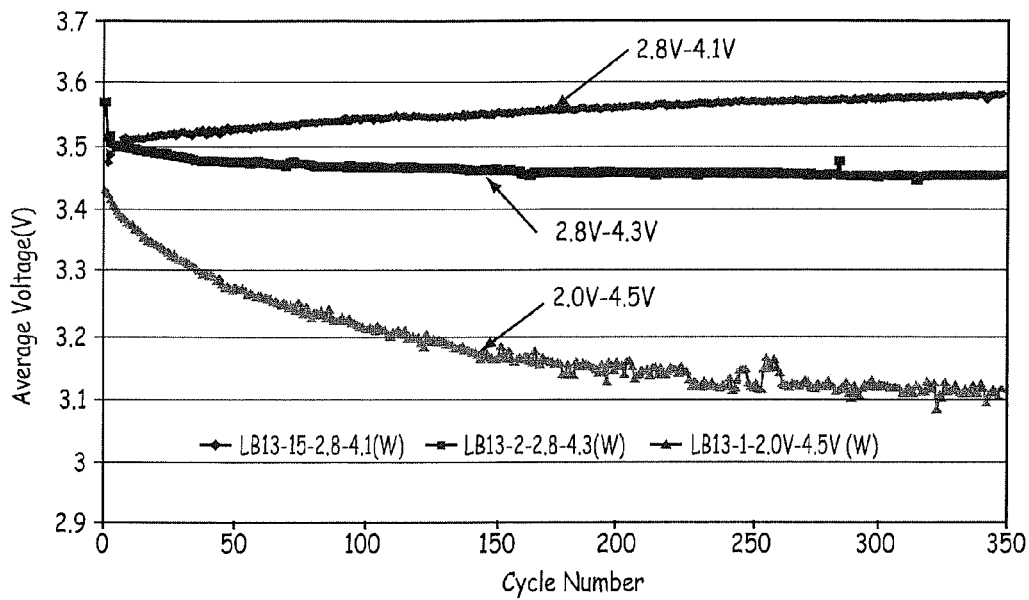
FIG. 6 is a graph containing plots of average discharge voltage versus cycle number for activated batteries with x=0.5 and cycled between 4.5 V and 2.0 V, or between 4.3 V and 2.8 V, or between 4.1 V and 2.8 V.
Figure 7:
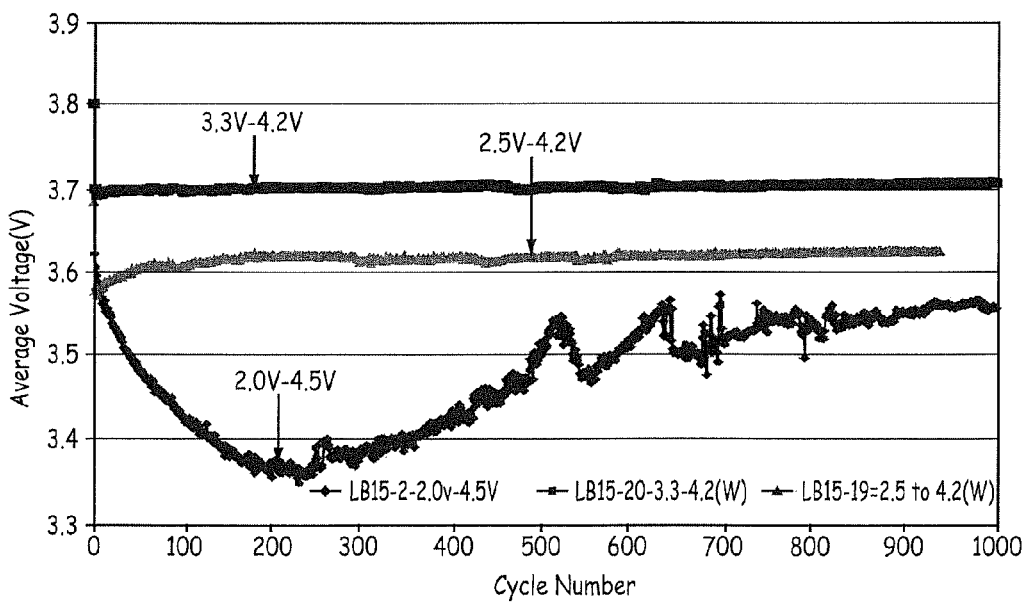
FIG. 7 is a graph containing plots of average discharge voltage versus cycle number for activated batteries with x=0.3 and cycled between 4.5 V to 2.0 V, or between 4.2 V and 3.3 V, or between 4.2 V and 2.5 V.

The results of cycling on average discharge voltage are displayed in FIGS. 6 and 7. FIG. 6 is a graph displaying plots of average discharge voltage versus cycle number for batteries with an active material having x=0.5. FIG. 7 is analogous to FIG. 6 and shows average discharge voltages of batteries with an active material having x=0.3. Referring to FIG. 6 (x=0.5), the battery cycled with an upper cycling voltage of 4.5 V showed a significant decrease in average discharge voltage over 350 cycles. On the other hand, the batteries cycled with upper cycling voltages of 4.1V and 4.3 V showed excellent cycling stability with respect to average discharge voltage over the same number of cycles. Surprisingly, the average discharge voltage of the battery cycled with an upper cycling voltage of 4.1V increased over cycles. With respect to FIG. 7 (x=0.3), the batteries cycled with an upper cycling voltage of 4.2V showed excellent cycling stability over 1000 cycles. In particular, the battery cycled between 2.5 V and 4.2 V showed a slight increase in average discharge voltage over cycles.

Example 6

Delayed Activation of Batter Compared With an Activated Batter

This Example demonstrates the effect of charging a coin cell battery to an activation voltage subsequent to cycling, and an activated cell is cycled for comparison.

For this Example, coin cell batteries were formed as described in Example 3 above. Two essentially equivalent batteries were fabricated. Each battery was fabricated from a negative electrode comprising graphitic carbon and a positive electrode comprising coated LMO particles where the positive electrode active material had x=0.3. The first battery was activated by initially charging it to 4.6V following the formation protocol referenced in Example 3 above prior to cycling 530 times between 2.5V and 4.2V. The second battery was initially cycled between 2.5V and 4.2V for 499 cycles. At the 500th cycle, the second battery was activated by charging it to 4.6 V at a rate of C/3 and was subsequently cycled 150 times between 2.5V and 4.2V. All cycling was done at a rate of C/3.

Figure 8:
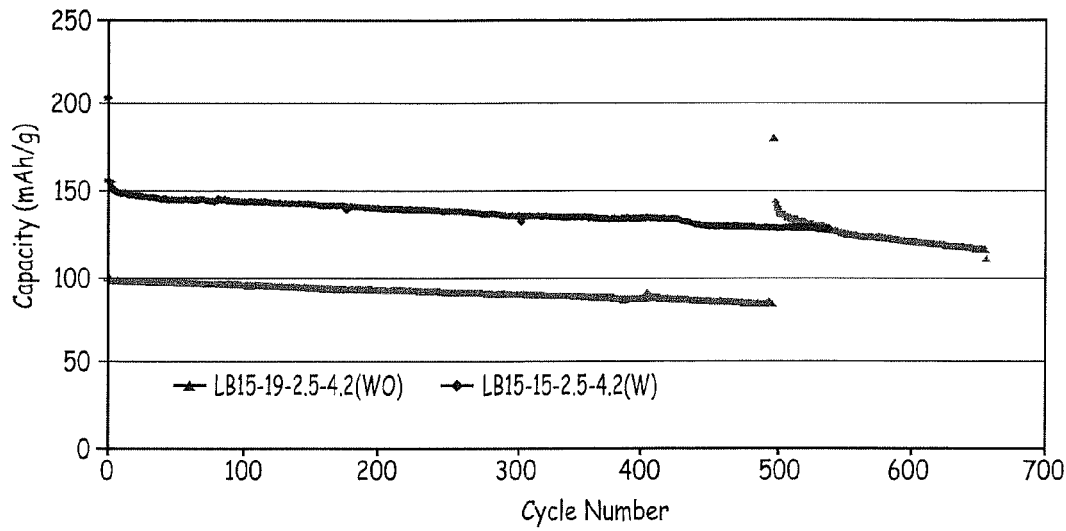
FIG. 8 is a graph containing plots of specific discharge capacity versus cycle number for an activated and non-activated battery with x=0.3 and cycled between 4.2 V and 2.5 V, the non-activated battery charged to 5.4 V during the charging step of the 500th cycle.

After activation of the second battery at the 500th cycled, the first and second batteries had similar cycling performance with respect to capacity fade. FIG. 8 is a plot of the specific discharge capacity versus cycle number for the first and second batteries. FIG. 8 shows that after about the 525th cycle, the first and second batteries had substantially similar discharge capacities and capacity fade. This result is consistent with a positive electrode active material with at least a high voltage phase and a low voltage phase.

Example 7

Charge/Discharge Activities of Activated and Unactivated Batteries

Figure 9:
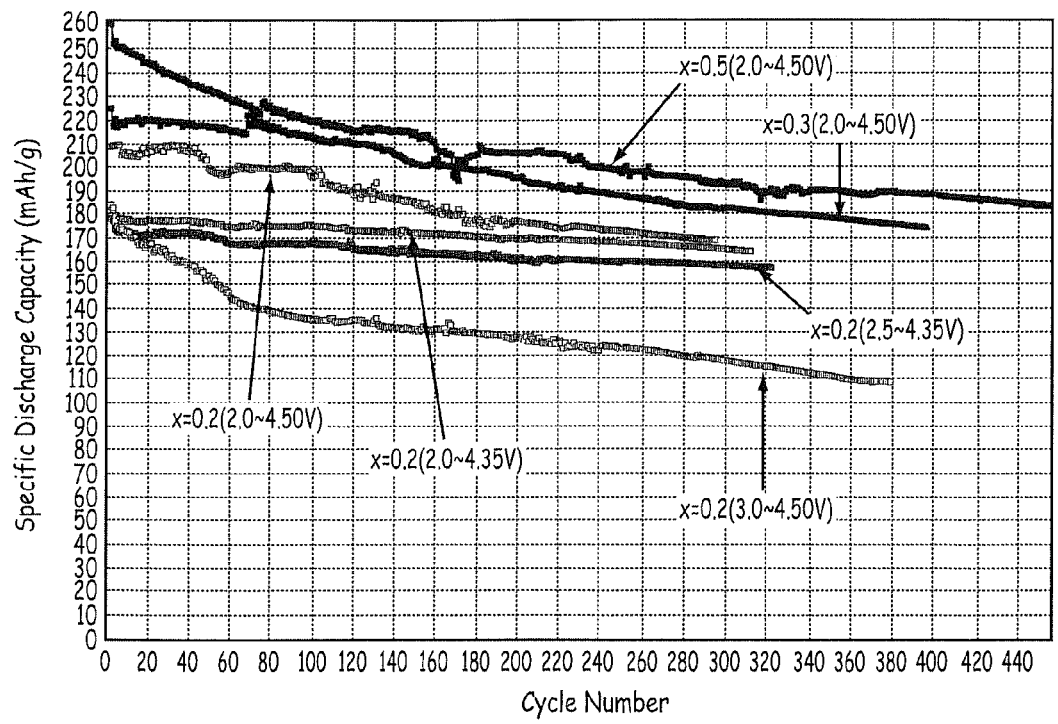
FIG. 9 is a graph containing plots of average discharge voltage versus cycle number for activated batteries with x=0.5, or x=0.3, or x=0.2 and discharged from no more than 4.5 V to no less than 2.0 V.

The example demonstrates changes in the charge activity and discharge activity of full cell batteries as a function of cycle number For this example, coin cell batteries were formed as described in Example 3 above and cycled. Batteries were formed from a negative electrode comprising graphitic carbon and a positive electrode comprising $AlBr_3$ coated LMO particles. Batteries were formed with positive electrode active materials having x=0.5, x=0.3, and x=0.2. Prior to cycling, some of the batteries were charged to 4.6V using the formation protocol referenced in Example 3 above, and these batteries were later cycled with a charge voltage of 4.5V. The batteries formed with positive electrode active materials having x=0.5 and x=0.3 were cycled between 2.0V and 4.5V for at least 295 cycles. The batteries formed with x=0.2 were cycled at least 295 times between 2.0V and 4.5V, between 2.0V and 4.35V, between 2.5V and 4.35V, or between 3.0V and 4.5V. The batteries with a charge voltage lower than 4.5V were not activated. Specific discharge capacity versus cycle number was tested for each battery and results are plotted in FIG. 9 for reference.

Figure 10:
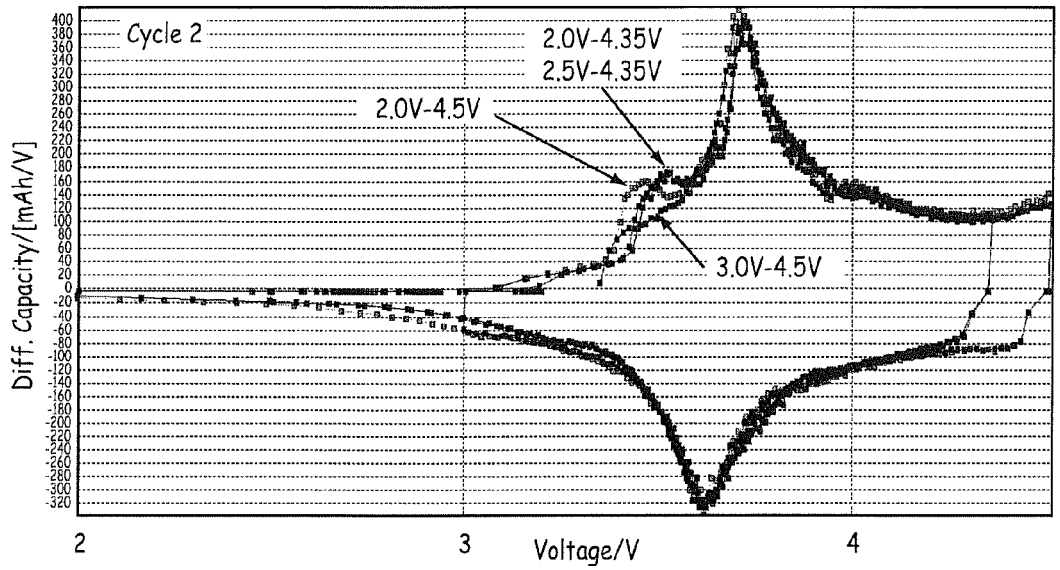
FIG. 10 is a graph containing differential capacity plots at cycle number 2 for activated batteries with x=0.2 and cycled between 4.5 V and 3.0 V, or between 4.5 V and 2.0 V, or between 4.35 V and 3.5 V, or between 4.35 V and 2.0 V.
Figure 11:
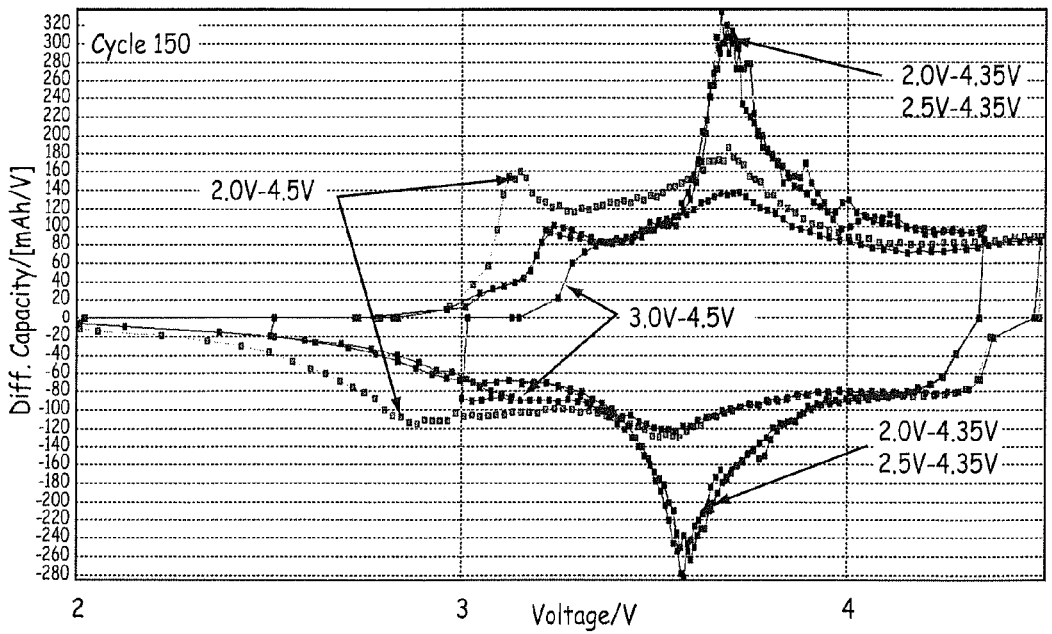
FIG. 11 is a graph containing differential capacity plots at cycle number 150 for activated batteries with x=0.2 and cycled between 4.5 V and 3.0 V, or between 4.5 V and 2.0 V, or between 4.35 V and 3.5 V, or between 4.35 V and 2.0 V.

FIGS. 10 and 11 are graphs containing plots of differential capacity versus voltage for the batteries with positive electrode active materials having x=0.2. Specifically, FIGS. 10 and 11 are graphs containing differential capacity plots at cycle numbers 2 and 150, respectively. Referring to FIG. 10 (cycle 2), at early cycles, charge/discharge activity is substantially derived from a high voltage region within the cycling window. For example, with respect to discharge, the differential capacity had a minimum at about 3.6 V. However, FIG. 11 reveals that at longer cycle numbers, the batteries cycled with an upper cycling voltage of 4.5 V had decreased activity in high voltage region of the cycling window and increased activity in the low voltage region. On the other hand, batteries cycled with an upper cycling voltage of 4.35 V maintained their activity in the high voltage region of the cycling window while having little increased activity within the low voltage region. These results are consistent with the development of a low voltage phase in the positive electrode active material at high upper cycling voltages.

Example 8

Cycling Performance of Non-Activated Batteries

This example demonstrates the cycling performance of non-activated cell coin cell batteries. As used in this example, non-activated batteries were not subjected to a formation step during the first charge to a high voltage value of 4.6V prior to cycling. As noted above, non-activated cells that are subsequently cycled to upper voltage values above 4.2 volts become partially activated during cycling.

Figure 12:
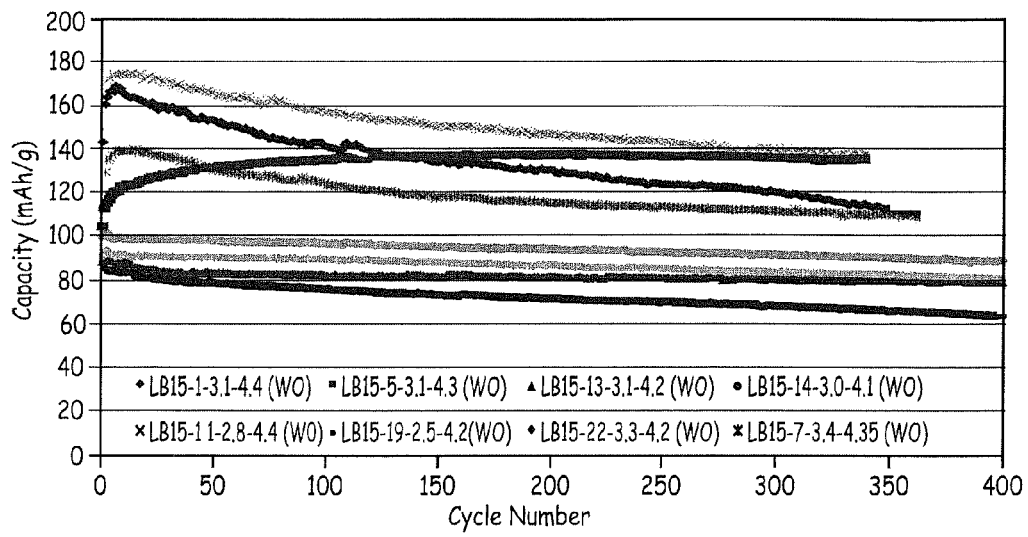
FIG. 12 is a graph containing plots of specific discharge capacity versus cycle number for non-activated and partially activated batteries with x=0.3 and cycled between different cycling voltage windows, the upper cycling voltage no more than 4.4 V and the lower cycling voltage no less than 2.5 V.

This Example demonstrates the effect of partial activation on capacity and average discharge voltage. For this Example, coin cell batteries were formed as described in Example 3 above. Each battery was fabricated from a graphitic carbon negative electrode and a positive electrode comprising coated LMO particles with a positive electrode active material having x=0.3. The batteries were cycled within various fixed voltage windows at a rate of C/3. FIG. 12 is a graph showing plots of the specific discharge capacity versus cycle number for the batteries tested in this example and results are tabulated in Table 9. Values in Table 9 denoted with an "*" reflect predicted values based on an extrapolation from earlier cycles.

TABLE 9

| Voltage window | Capacity (obtained/ projected after 350 cycles) | % Retained |
| --- | --- | --- |
| 2.5 to 4.2 | 88 | 89 |
| 2.8 to 4.4 | 140 | 80 |
| 3.0 to 4.1 | 64 | 78 |
| 3.1 to 4.2 | 81 | 93 |
| 3.1 to 4.3 | 138* | 112* |
| 3.1 to 4.4 | 111 | 67 |
| 3.3 to 4.2 | 82 | 90 |
| 3.4 to 4.35 | 110 | 80 |

Referring to table 9, the best over-all performing battery was the partially activated battery cycled between 3.1V and 4.3 V. The performance of the battery cycled between 3.1V and 4.3V was notable in that the battery showed an increase in capacity retention over 350 cycles and had specific capacity nearly as large as the battery cycled between 2.8 V and 4.4 V, despite having a smaller cycling voltage window. These results are consistent with gradually activation of the high voltage phase of the positive electrode active material over a plurality of cycles.

Comparison of Tables 8 and 9 reveals that while activated batteries generally show improved cycling performance based on discharge capacity relative to non-activated batteries, partially activated batteries generally showed improved cycling performance relative to activated batteries. The activated batteries cycled between 2.5V and 4.2V, 3.0V and 4.1V, and 3.3V to 4.2V had increased specific discharge capacity and capacity retention after 350 cycles relative to the non-activated batteries cycled at those voltage ranges. On the other hand, partially activated batteries cycled between 2.8V and 4.4V, 3.1V and 4.3V, 3.1V and 4.4V, and 3.4V and 4.35V showed similar or improved specific discharge capacity and capacity retention after 350 cycles relative to the activated batteries cycled between those voltage ranges.

Example 9

Cycling Performance of Activated Batteries: Pouch Cells

This example demonstrates the long cycle performance of activated pouch cell batteries.

For this example, pouch cell batteries were fabricated as described in Example 3 above. Two essentially equivalent batteries were fabricated. Each battery was fabricated from a negative electrode comprising graphitic carbon and a positive electrode comprising coated LMO particles where the positive electrode active material had x=0.3. Both batteries were activated by initially charging to 4.6V following the formation protocol referenced in Example 3 prior to cycling 250 times. The first battery was cycled between 2.0V and 4.5V and the second battery was cycled between 3.15V and 4.1V.

Figure 13A:
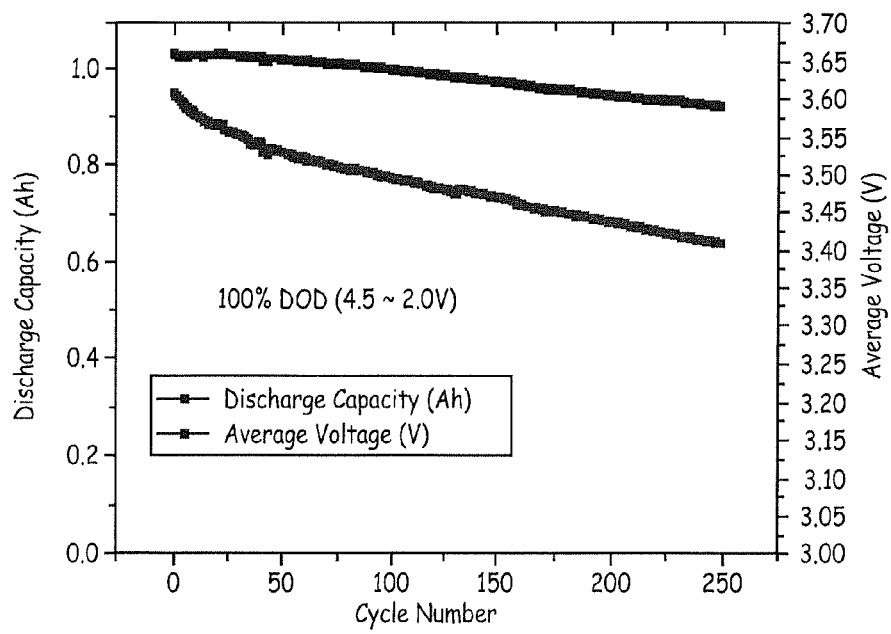
FIG. 13a is a graph containing plots of discharge capacity and average discharge voltage for activated pouch cell batteries with x=0.3 and cycled between 4.5 V and 2.0 V.
Figure 13B:
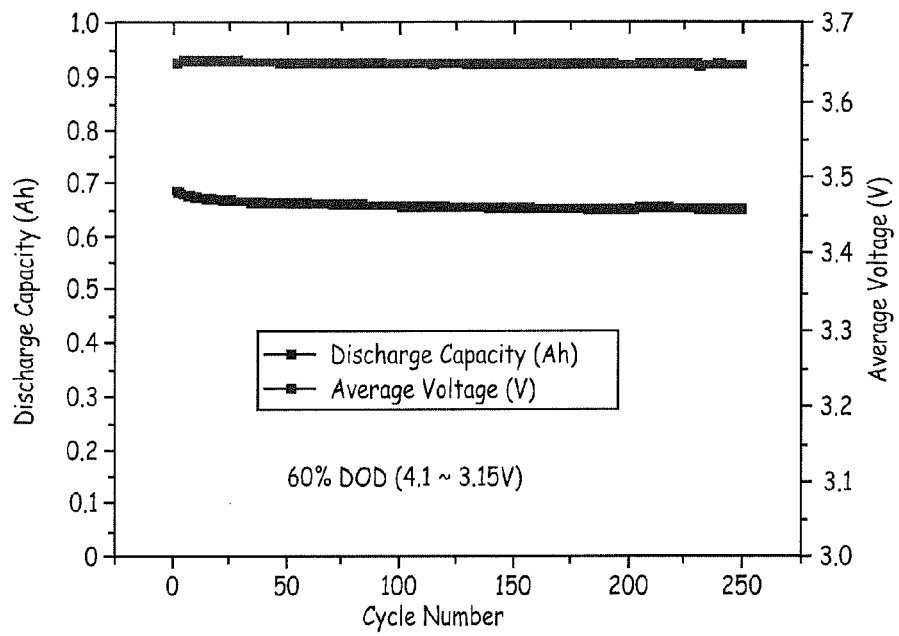
FIG. 13b is a graph containing plots of discharge capacity and average discharge voltage for activated pouch cell batteries with x=0.3 and cycled between 4.1 V and 3.15 V.

It was generally seen that while both batteries had excellent cycling performance, the battery cycled between 3.15V and 4.1V had greatly improved cycling performance relative to the battery cycled between 2.0V and 4.5V. FIG. 13a is a graph containing plots of discharge capacity as a function of cycle number and average discharge voltage as a function of cycle number, for the battery cycled between 2.0V and 4.5V. FIG. 13b is a graph containing analogous plots for the battery cycled between 3.15V and 4.1V. FIG. 13a reveals that after 250 cycles, the battery cycled between 2.0V and 4.5V retained about 88.5% of its capacity and had a drop in average discharge voltage of about 5.6%. On the other hand, FIG. 13b reveals that after 250 cycles, the battery cycled between 3.15V and 4.1V retained 93% of its capacity and had no appreciable drop in average discharge voltage.

Figure 14:
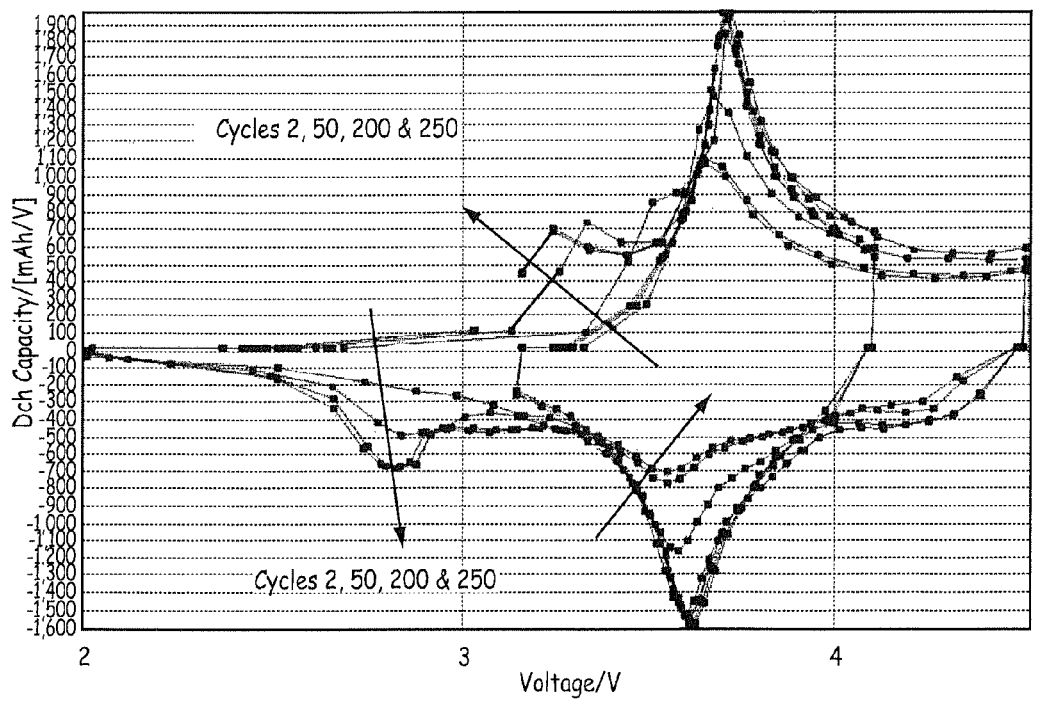
FIG. 14 is a graph containing differential capacity plots at cycle numbers 2, 50, 200, and 250 for activated pouch cell batteries with x=03 and cycled between 4.5 V and 2.0 V or between 4.1V and 3.15 V.

The cycling window dependence of the average discharge voltage can be understood in terms of the charge/discharge activities. FIG. 14 is a graph containing plots of differential charge/discharge capacities as a function as a function of charge/discharge voltage for both batteries. In particular, results are plotted for cycles 2, 50, 200, and 250. Referring to FIG. 14, for the battery cycled between 2.0 V and 4.5 V there was increased activity in the low voltage range of the cycling window and decreased activity in the high voltage range of the cycling window with increased cycle numbers. On the other hand, the activity of battery cycled between 3.1 V and 4.1 V was predominantly derived from the high voltage range of the cycling window for all cycles. These results are consistent with the development of a low voltage phase in the positive electrode active material at high upper cycling voltages.

Example 10

Comparison of Long Term Cycling Performance of Activated and Partially Activated Batteries The example demonstrates the long term cycling performance of activated and partially activated batteries.

To demonstrate cycling performance at long cycles, 3 pouch cell batteries were formed as described in Example 3, above. Each battery was fabricated with graphitic carbon negative electrode and positive electrode comprising coated LMO particles with x=0.3. Two pouch cell batteries were activated using the two step protocol referenced in Example 4, and one pouch cell battery was not activated to test partial activation.

With respect to the pouch cell batteries, a first activated battery and the partially activated battery were cycled between about 4.25 V and about 2.73 V with a charge rate of about 1C and a discharge rate of about 2C. A second activated battery was cycled between about 4.1 V and about 3.14 V with charge and discharge rates of about 0.75C. Cycling results for all three batteries are displayed in FIGS. 15-18.

Figure 15:
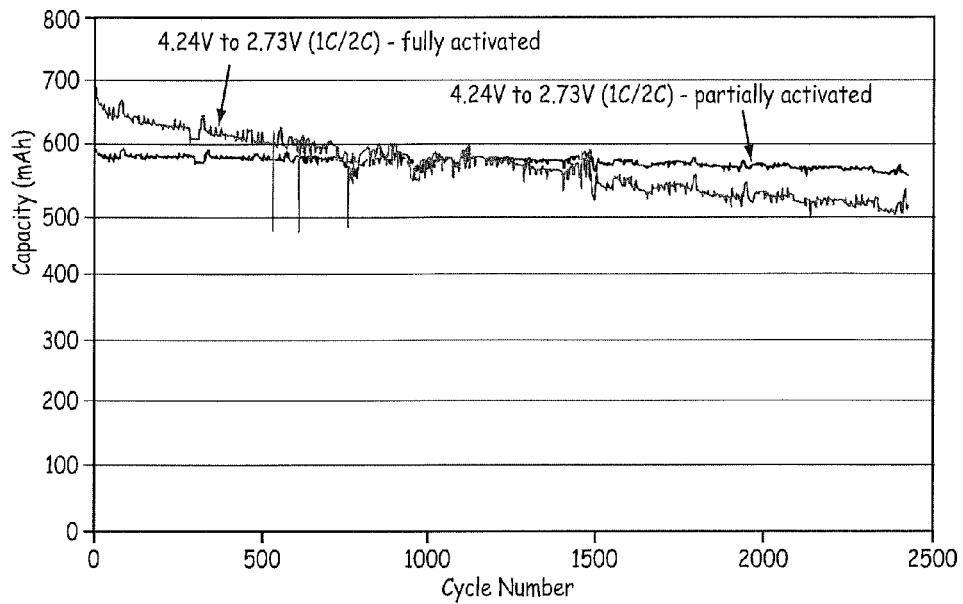
FIG. 15 is a graph containing plots of discharge capacity versus cycle number for an activated and a partially activated cell battery with a lithium foil negative electrode, both cycled between 4.24 V and 2.73 V at a charge rate of 1C and a discharge rate of 2C.
Figure 16:
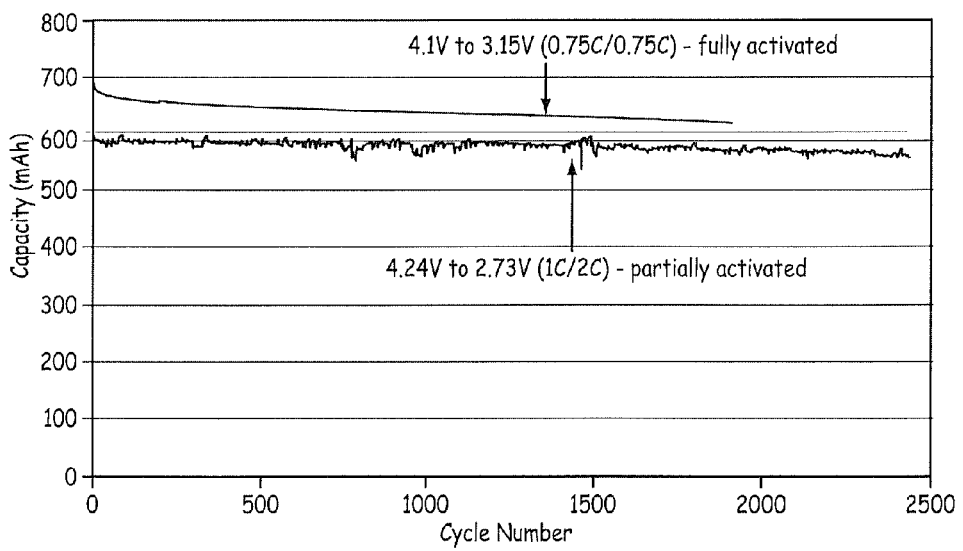
FIG. 16 is a graph containing plots of discharge capacity versus cycle number for an activated and partially activated battery, the activated battery cycled between 4.1 V and 3.15 V at charge and discharge rates of 0.75C and the partially activated battery cycled between 4.24 V and 2.73 V at a charge rate of 1C and a discharge rate of 2C.

Generally, all three batteries had excellent cycling performance with respect to capacity. FIGS. 15 and 16 are graphs showing plots of discharge capacity versus cycle number for the fully and partially activated batteries. For identical cycling voltage windows and cycling rates, the discharge capacity of the activated battery was larger than that of the partially activated battery to about 1500 cycles, although the partially activated battery displayed improved capacity retention. With respect to the activated battery cycled between 4.1 V and 3.15 V at a charge/discharge rate of 0.75, improved battery capacity was observed to 2000 cycles, relative to the partially activated battery. With respect to capacity retention, the partially activated battery outperformed both activated batteries, although capacity retention was excellent in all cases.

Figure 17:
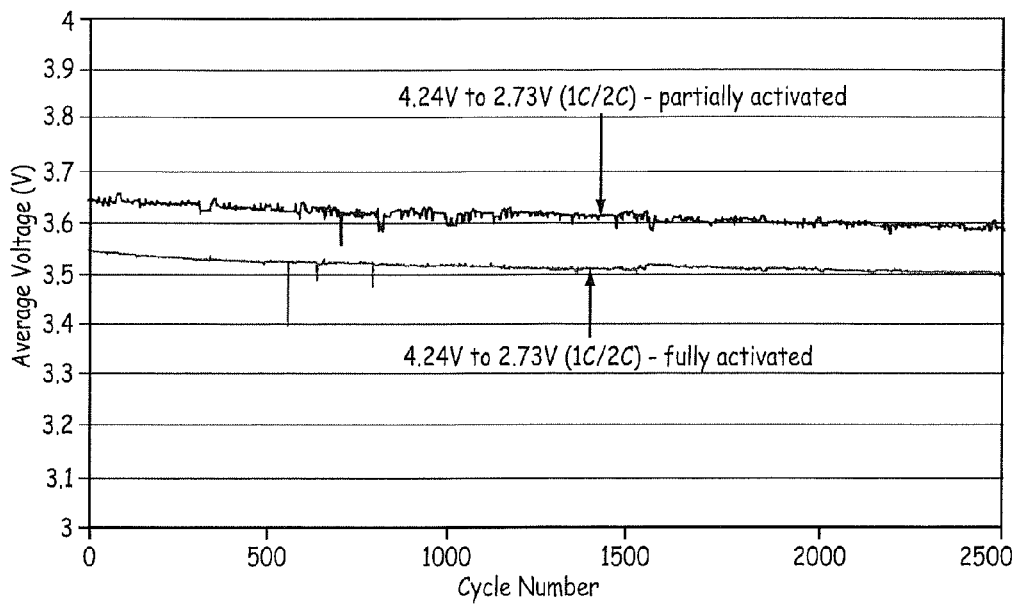
FIG. 17 is a graph containing plots of average discharge voltage versus cycle number for an activated and a partially activated cell battery, both cycled between 4.24 V and 2.73 V at a charge rate of 1C and a discharge rate of 2C.
Figure 18:
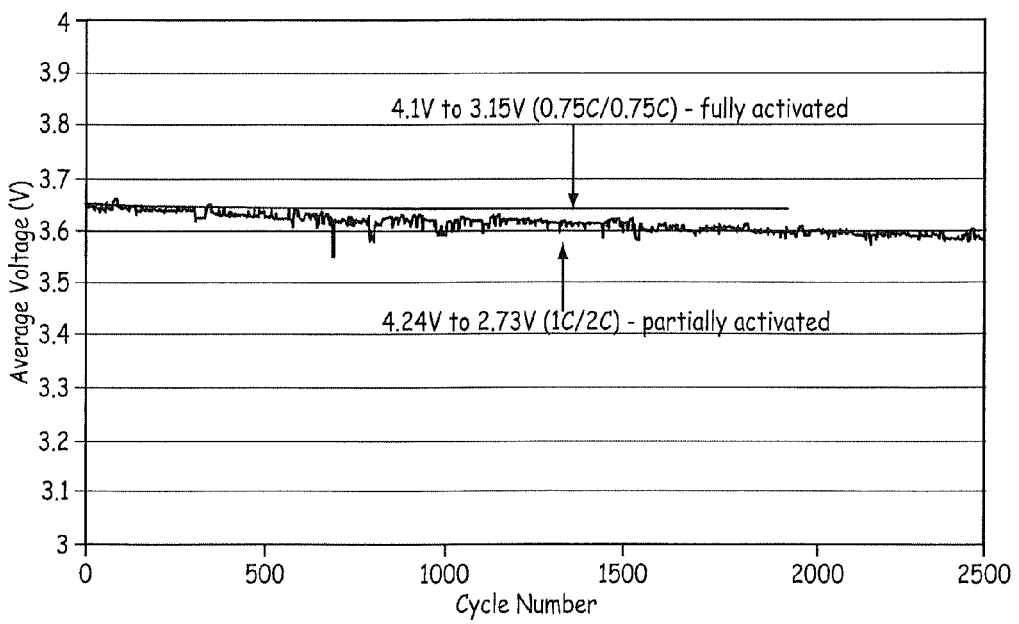
FIG. 18 is a graph containing plots of average discharge voltage versus cycle number for an activated and partially activated battery, the activated battery cycled between 4.1 V and 3.15 V at charge and discharge rates of 0.75C and the partially activated battery cycled between 4.24 V and 2.73 V at a charge rate of 1C and a discharge rate of 2C.

Similarly, all three batteries had excellent cycling performance with respect to average discharge voltage. FIGS. 17 and 18 are graphs showing plots of average discharge voltage versus cycle number for the activated and partially activated batteries. FIGS. 17 and 18 reveal that given identical cycling voltage windows and cycling rates, the partially activated battery cycled with higher average discharge voltages than the activated battery with comparable stability. On the other hand, the activated battery cycled between 4.1 V and 3.15 V at a rate of 0.75C cycled with improved average discharge voltages and stability relative to the partially activated battery. In all cases, cycling performance with respect to average discharge voltage was excellent.

Example 11

Positive Electrode Stability

This Example demonstrates the effects cycling window voltages on the stability of the positive electrode.

For this Example, 3 batteries (2 pouch batteries and 1 coin cell battery) were formed as described in Example 3 above. Each battery was fabricated from a negative electrode comprising graphitic carbon and a positive electrode comprising coated LMO particles where the positive electrode active material had x=0.3 (batteries 1 and 2) or x=0.5 (battery 3). Batteries 1 and 2 for this example were the same as the batteries 1 and 2 in Example 10. After assembly, batteries 1 and 3 were subjected to a two-step formation process with a charge voltage of 4.6V as described in U.S. patent application Ser. No. 12/732,520, now U.S. Pat. No. 8,765,306 to Amiruddin et al., entitled "High Voltage Battery Formation Protocols and Control of Charging and Discharging for Desirable Long Term Cycling Performance," incorporated herein by reference. During the formation process, batteries 1 and 3 were fully activated, and battery 2 was charged to 4.3 V. Batteries 1 and 2 were cycled for 2500 cycles at a rate of C/3 between 2.73 V and 4.24 V, and the specific capacity and average voltage for these batteries is described in Example 10. Battery 3 was cycled for 550 cycles at a rate of 1C charge and 2C discharge between 2 V and 4.5 V. Batteries 1 and 2 were cycled for cycles 2-4 over a voltage range intermediate between the formation voltage range the long term cycling voltage range.

After cycling, the batteries were dismantled and the negative electrode of each battery was analyzed for transition metal concentration using integrated coupled plasma (ICP) for cells 1 and 2 and glow-discharge mass spectrometry ("GDMS") for cell 3. During cycling, transition metals in the positive electrode active composition can dissolve and migrate to the negative electrode. As such, transition metal concentration in the negative electrode is a measure of the positive electrode stability. The results of the analysis of the negative electrode are found in Table 10.

TABLE 10

| Battery | Cycling Window Voltage | Metal Dissolution | | |
| --- | --- | --- | --- | --- |
| | | Ni | Co | Mn |
| 1 | 2.73 V-4.24 V | 14 ppm | 45 ppm | 470 ppm |
| 2 | 2.73 V-4.24 V | 22 ppm | 19 ppm | 56 ppm |
| 3 | 2 V-4.5 V | 2.7 wt % | 2 wt % | 8.6 wt % |

The results presented in Table 10 demonstrate excellent positive electrode stability over long cycles with batteries cycled between 2.73V and 4.24V (batteries 1 and 2). The Mn concentration in the negative electrodes of batteries 1 and 2 were 470 ppm and 56 ppm, respectively, indicating very little transition metal dissolution from the positive electrodes over long cycles and, therefore, extremely good cycling stability. Moreover, although these result suggest that the positive electrode cycled more stably in the partially activated battery (battery 2), the positive electrodes of the partially and fully (battery 1) activated batteries both cycled extremely stably. On the other hand, the transition metal concentration in the negative electrode of the battery cycled between 2V and 4.5V (battery 3) was as much as 4 orders of magnitude higher than the transition metal concentration in the batteries cycled between 2.73V and 4.24V. Taking into account that battery 3 was cycled for significantly fewer cycles than batteries 1 and 2, the results indicate that the positive electrode of battery 3 cycled much less stably relative the positive electrodes in batteries 1 and 2.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A lithium ion battery comprising:
    a positive electrode comprising a lithium rich metal oxide composition;
    a negative electrode comprising a lithium intercalation/alloying composition;
    a non-aqueous electrolyte comprising lithium ions;
    a separator between the negative electrode and the positive electrode; and
    wherein the battery has been cycled through a formation cycle and wherein at the 500th cycle, the battery has a specific discharge capacity based on the mass of the positive electrode active composition of at least about 100 mAh/g at a discharge rate of C/3 from 4.25V to 2.0V that is at least about 90% of the 5th cycle specific discharge capacity and an average discharge voltage at a discharge rate of C/3 that is at least about 87.5% of the $5^{th}$ cycle average discharge voltage.

2. The lithium ion battery of claim 1 wherein the battery has been charged to a voltage upper limit from about 4.225 V to 4.45V during the formation cycle.

3. The lithium ion battery of claim 1 wherein the battery has been charged to a voltage upper limit from about 4.25 V to 4.375V during the formation cycle.

4. The lithium ion battery of claim 1 wherein the lithium metal oxide can be approximately represented by a formula $Li_{1+a}Ni_\alpha Mn_\beta Co_\gamma A_\delta O_{2-z}F_z$, where a ranges from about 0.05 to about 0.3, α ranges from 0 to about 0.4, β range from about 0.2 to about 0.65, γ ranges from 0 to about 0.46, δ ranges from about 0 to about 0.15, z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li, or combinations thereof.

5. The lithium ion battery of claim 1 wherein the lithium metal oxide can be approximately represented by the formula $xLi_2MnO_3 \cdot (1-x)LiNi_u Mn_v Co_w A_y O_2$, where 0.03≤x≤0.55, 0≤w≤1, 0≤u≤0.5, 0≤y≤0.1 and v≈u.

6. The battery of claim 5 wherein x is between about 0.2 and 0.5.

7. The battery of claim 1 wherein the lithium rich metal oxide is coated with a metal halide or an inert metal oxide.

8. The lithium ion battery of claim 1 wherein the negative electrode comprises a graphitic carbon active material.

9. The battery of claim 1 wherein the electrolyte comprises a stabilizing additive.

10. The battery of claim 1 wherein at the 500th cycle, the battery has a specific discharge capacity that is at least about 90% of the 5th cycle specific discharge capacity and an average discharge voltage at a discharge rate of C/3 that is at least about 90% of the $5^{th}$ cycle average discharge voltage.

11. The battery of claim 1 wherein at the 1000th cycle, the battery has a specific discharge capacity that is at least about 87.5% of the 5th cycle specific discharge capacity and an average discharge voltage at a discharge rate of 2C that is at least about 87.5% of the $5^{th}$ cycle average discharge voltage.

12. The battery of claim 1 wherein at the 2500th cycle, the battery has a specific discharge capacity that is at least about 85% of the 5th cycle specific discharge capacity and an average discharge voltage at a discharge rate of 2C that is at least about 85% of the $5^{th}$ cycle average discharge voltage.

13. A method for cycling a lithium ion battery having a negative electrode comprising a lithium intercalation/alloying composition and a positive electrode comprising a lithium rich metal oxide, the method comprising:
    following an initial formation cycle, cycling the battery with a charge voltage from about 4V to about 4.35V at an average discharge rate from about C/5 to about 2C, wherein the capacity after 2000 cycles is at least about 80 percent of the capacity at the 5th cycle at the same average discharge rate and the average voltage after 2000 cycles is at least about 85 percent of the 5th cycle average voltage at the same average discharge rate wherein the battery has a specific discharge capacity at the 5th cycle of at least about 100 mAh/g.

14. The method of claim 13 wherein the lithium metal oxide can be approximately represented by a formula $Li_{1+a}Ni_\alpha Mn_\beta Co_\gamma A_\delta O_{2-z}F_z$, where a ranges from about 0.05 to about 0.3, α ranges from 0 to about 0.4, β range from about 0.2 to about 0.65, γ ranges from 0 to about 0.46, δ ranges from about 0 to about 0.15, z ranges from 0 to about 0.2 with the proviso that both α and γ are not zero, and where A is Mg, Sr, Ba, Cd, Zn, Al, Ga, B, Zr, Ti, Ca, Ce, Y, Nb, Cr, Fe, V, Li, or combinations thereof.

15. The lithium ion battery of claim 13 wherein the lithium metal oxide can be approximately represented by the formula $xLi_2MnO_3 \cdot (1-x) Li Ni_u Mn_v Co_w A_y O_2$, where 0.03≤x≤0.55, 0≤w≤1, 0≤u≤0.5, 0≤y≤0.1 and v≈u.

16. The method of claim 15 wherein x is between about 0.2 and 0.5, wherein the lithium rich metal oxide is coated with a metal halide or an inert metal oxide, wherein the lithium ion battery comprises a negative electrode comprising a graphitic carbon active material, and wherein the electrolyte comprises a stabilizing additive.

17. The method of claim 13 wherein the initial formation cycle comprises charging the battery to a voltage value from 4.225V to about 4.45 V.

18. The method of claim 13 wherein the capacity after 2000 cycles is at least about 90 percent of the capacity at the 5th cycle at the same average discharge rate and the average voltage after 2000 cycles is at least about 90 percent of the 5th cycle average voltage at the same average discharge rate.

19. The method of claim 13 wherein the capacity after 2000 cycles is at least about 92.5 percent of the capacity at the 5th cycle at the same average discharge rate and the average voltage after 2000 cycles is at least about 92.5 percent of the 5th cycle average voltage at the same average discharge rate.

20. The method of claim 13 wherein the battery is charged to a voltage from about 4.25V to about 4.4V during cycling.

21. The method of claim 13 wherein the negative electrode after 2000 cycles comprises no more than about 1 weight percent manganese.

22. A method for cycling a lithium ion battery having negative electrode comprising a lithium intercalation/alloying composition and a positive electrode comprising a lithium rich metal oxide, the method comprising:
    following an initial formation cycle, cycling the battery with a charge voltage from about 3.8 to about 4.25 at an average rate from about C/5 to about 2C, wherein the capacity after 2000 cycles is at least about 80 percent of the capacity at the 5th cycle at the same average rate and the average voltage after 2000 cycles is at least about 85 percent of the 5th cycle average voltage at the same average rate.

23. The method of claim 22 wherein the battery has a specific discharge capacity at the 5th cycle of at least about 125 mAh/g when cycled from the selected charge voltage to 2V.

24. The method of claim 22 wherein the lithium metal oxide can be approximately represented by a formula $Li_{1+a}Ni_\alpha Mn_\beta Co_\gamma A_\delta O_{2-z}F_z$, where a ranges from about 0.05 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15, z ranges from 0 to about 0.2 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, Li, or combinations thereof.

25. The method of claim 22 wherein the lithium metal oxide can be approximately represented by the formula $xLi_2MnO_3 \cdot (1-x) Li Ni_u Mn_v Co_w A_y O_2$, where $0.03 \leq x \leq 0.55$, $0 \leq w \leq 1$, $0 \leq u \leq 0.5$, $0 \leq y \leq 0.1$ and $v \approx u$.

26. The method of claim 25 wherein x is between about 0.1 and 0.4, wherein the lithium rich metal oxide is coated with a metal halide or an inert metal oxide, wherein the lithium ion battery comprises a negative electrode comprising a graphitic carbon active material, and wherein the electrolyte comprises a stabilizing additive.

27. The method of claim 22 wherein the initial formation cycle comprises charging the battery to a voltage value greater than about 4.45V.

28. The method of claim 22 wherein the capacity after 2000 cycles is at least about 85 percent of the capacity at the 5th cycle at the same average rate and the average voltage after 2000 cycles is at least about 96 percent of the 5th cycle average voltage at the same average rate.

29. The method of claim 22 wherein the negative electrode after 2000 cycles comprise no more than about 1 weight percent manganese.

30. A method for cycling a lithium ion battery having a positive electrode comprising a lithium rich metal oxide, the method comprising:
following an initial formation cycle, cycling the battery with a charge voltage from about 4.25 to about 4.375 at an average rate from about C/5 to about 2C, wherein the battery is discharged to a voltage of no more than about 2.9V at least once every 200 cycles and wherein the capacity after 2000 cycles is at least about 80 percent of the capacity at the 5th cycle at the same average rate and the average voltage after 2000 cycles is at least about 85 percent of the 5th cycle average voltage at the same average rate.

31. The method of claim 30 wherein the battery has a specific discharge capacity at the 5th cycle of at least about 125 mAh/g when cycled from the selected charge voltage to 2V.

32. The method of claim 30 wherein the lithium metal oxide can be approximately represented by a formula $Li_{1+a}Ni_\alpha Mn_\beta Co_\gamma A_\delta O_{2-z}F_z$, where a ranges from about 0.05 to about 0.3, $\alpha$ ranges from 0 to about 0.4, $\beta$ range from about 0.2 to about 0.65, $\gamma$ ranges from 0 to about 0.46, $\delta$ ranges from about 0 to about 0.15, z ranges from 0 to about 0.2 with the proviso that both $\alpha$ and $\gamma$ are not zero, and where A is Mg, Sr, Ba, Cd, Zn, Al, Ga, B, Zr, Ti, Ca, Ce, Y, Nb, Cr, Fe, V, Li, or combinations thereof.

33. The method of claim 30 wherein the lithium metal oxide can be approximately represented by the formula $xLi_2MnO_3 \cdot (1-x) LiNi_u Mn_v CowA_y O_2$, where $0.03 \leq x \leq 0.55$, $0 \leq w \leq 1$, $0 \leq u \leq 0.5$, $0 \leq y \leq 0.1$ and v u.

34. The method of claim 33 wherein x is between about 0.1 and 0.4, wherein the lithium rich metal oxide is coated with a metal halide or an inert metal oxide, wherein the lithium ion battery comprises a negative electrode comprising a graphitic carbon active material, and wherein the electrolyte comprises a stabilizing additive.

35. The method of claim 30 wherein the initial formation cycle comprises charging the battery to a voltage value greater than about 4.45V.

36. The method of claim 30 wherein the capacity after 2000 cycles is at least about 85 percent of the capacity at the 5th cycle at the same average rate and the average voltage after 2000 cycles is at least about 96 percent of the 5th cycle average voltage at the same average rate.

37. The method of claim 30 wherein the battery is discharged to a voltage of no more than about 2.9V at least once every 150 cycles.

* * * * *